(12) United States Patent
Beller

(10) Patent No.: US 11,643,072 B2
(45) Date of Patent: May 9, 2023

(54) PLANNING ACCOMMODATIONS FOR PARTICULATE MATTER

(71) Applicant: Zoox, Inc., Foster City, CA (US)

(72) Inventor: Andrew E. Beller, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 177 days.

(21) Appl. No.: 16/586,650

(22) Filed: Sep. 27, 2019

(65) Prior Publication Data
US 2021/0094538 A1    Apr. 1, 2021

(51) Int. Cl.
*B60W 30/09*     (2012.01)
*B60W 30/095*    (2012.01)
*B60W 40/08*     (2012.01)
*B60W 40/10*     (2012.01)
*G05D 1/00*      (2006.01)
*G05D 1/02*      (2020.01)

(52) U.S. Cl.
CPC ........ *B60W 30/09* (2013.01); *B60W 30/0956* (2013.01); *B60W 40/08* (2013.01);
(Continued)

(58) Field of Classification Search
CPC .. B60W 30/09; B60W 30/0956; B60W 40/08; B60W 40/10; B60W 2520/10;
(Continued)

(56) References Cited

U.S. PATENT DOCUMENTS 9,645,577 B1 *   5/2017 Frazzoli ............ B60W 30/0956
2015/0158486 A1 * 6/2015 Healey .................. B60W 30/12
701/23
(Continued)

FOREIGN PATENT DOCUMENTS

EP         3456597 A2    3/2019
WO    WO2014047250 A1    3/2014
(Continued)

OTHER PUBLICATIONS

PCT Search Report and Written Opinion dated Jan. 26, 2021 for PCT Application No. PCT/US20/52869, 15 pages.
(Continued)

*Primary Examiner* — Jason Holloway
*Assistant Examiner* — Mohamad O El Sayah
(74) *Attorney, Agent, or Firm* — Lee & Hayes, P.C.

(57) ABSTRACT

Techniques for detecting an object in an environment, determining a probability that the object is a region of particulate matter, and controlling a vehicle based on the probability. The region particulate matter may include steam (e.g., emitted from a man-hole cover, a dryer exhaust port, etc.), exhaust from a vehicle (e.g., car, truck, motorcycle, etc.), dust, environmental gases (e.g., resulting from sublimation, fog, evaporation, etc.), or the like. Based on the associated probability that the object is a region of particulate matter, a vehicle computing system may substantially maintain a vehicle trajectory, modify a trajectory of the vehicle to ensure the vehicle does not impact the object, stop the vehicle, or otherwise control the vehicle to ensure that the vehicle continues to progress in a safe manner. The vehicle controller may continually adjust the trajectory based on additionally acquired sensor data and associated region probabilities.

20 Claims, 6 Drawing Sheets

(52) U.S. Cl.
CPC ........... *B60W 40/10* (2013.01); *G05D 1/0088* (2013.01); *G05D 1/0223* (2013.01); *B60W 2520/10* (2013.01); *B60W 2720/10* (2013.01); *G05D 2201/0213* (2013.01)

(58) Field of Classification Search
CPC ............ B60W 2720/10; G05D 1/0088; G05D 1/0223; G05D 2201/0213
See application file for complete search history.

(56) References Cited

U.S. PATENT DOCUMENTS

| | | | |
|---|---|---|---|
| 2016/0207530 A1* | 7/2016 | Stanek | B60W 30/09 |
| 2017/0161570 A1 | 6/2017 | Zhao et al. | |
| 2018/0284803 A1* | 10/2018 | Lee | G06V 10/44 |
| 2018/0326982 A1* | 11/2018 | Paris | G05D 1/0088 |
| 2019/0064829 A1* | 2/2019 | Ozawa | G05D 1/0214 |
| 2020/0042001 A1* | 2/2020 | Chu | G01S 13/66 |
| 2021/0086758 A1* | 3/2021 | Yamanaka | G08G 1/143 |
| 2021/0116907 A1* | 4/2021 | Altman | B60W 60/0015 |

FOREIGN PATENT DOCUMENTS

| | | | | |
|---|---|---|---|---|
| WO | WO2018172849 A1 | 9/2018 | | |
| WO | WO-2019112514 A1 * | 6/2019 | ........... | G01S 7/4817 |

OTHER PUBLICATIONS

International Preliminary Report on Patentability for PCT Application No. PCT/US20/52869, dated Apr. 7, 2022.

* cited by examiner

PLANNING ACCOMMODATIONS FOR PARTICULATE MATTER

BACKGROUND

Various methods, apparatuses, and systems are utilized to guide autonomous vehicles through environments including various static and dynamic objects. For instance, an autonomous vehicle may include sensors, such as lidar, radar, cameras, and the like, to detect moving and stationary objects in an environment. The sensors may additionally collect data associated with particulate matter, such as steam emanating from a manhole cover, exhaust from vehicles, or the like. In some examples, the autonomous vehicle may utilize the sensor data to make control decisions, such as determining where to drive based in part on the detected objects. However, the autonomous vehicle may perceive the particulate matter as an object to be avoided, which may disrupt forward progress by causing the vehicle to stop or adjust a path to avoid the particulate matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
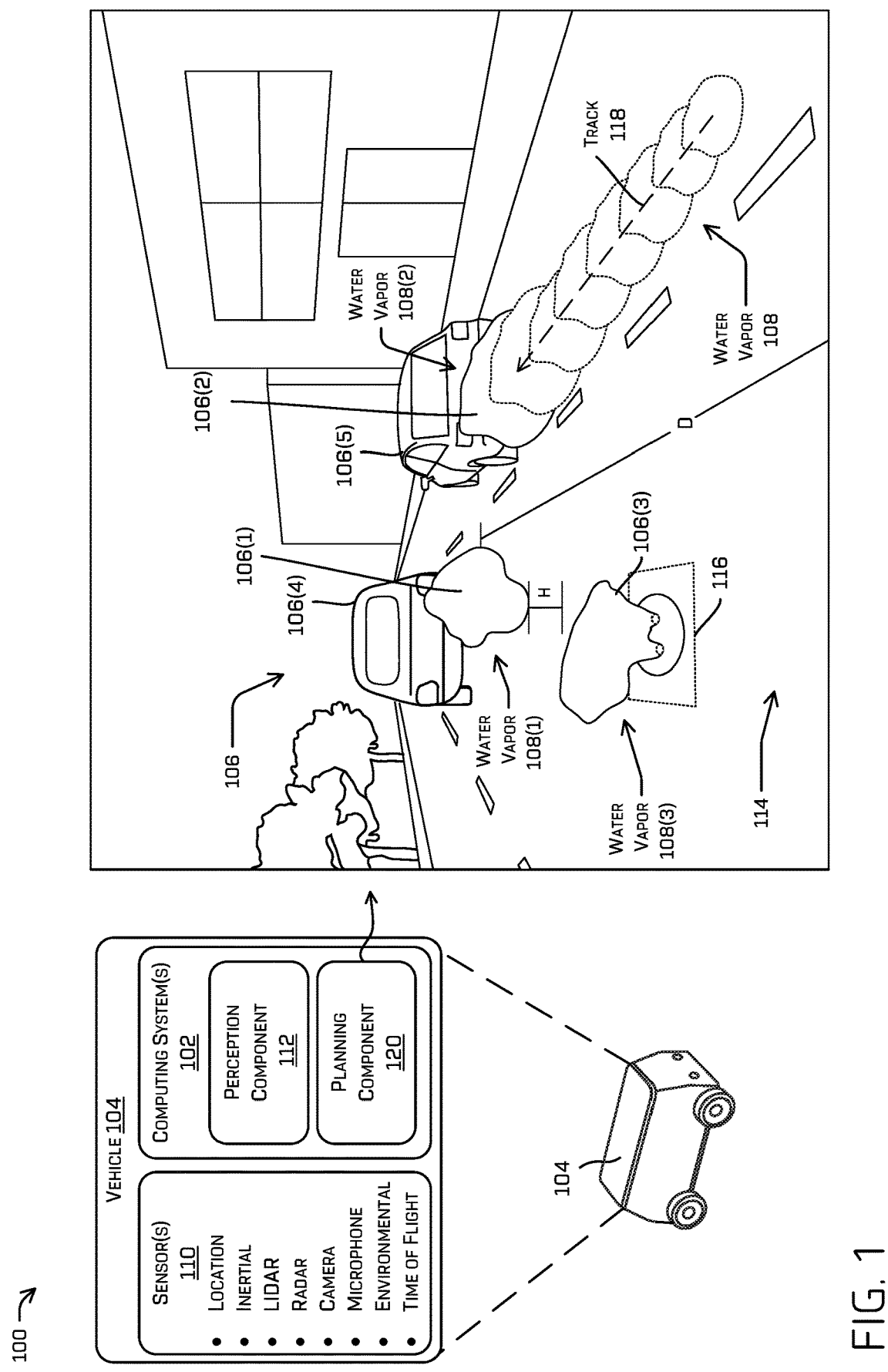
FIG. 1 is an example in which a vehicle computing system of an autonomous vehicle may detect objects and control the vehicle based on a probability that the objects are associated with regions of particulate matter (such as water vapor), in accordance with examples of the disclosure.

This disclosure relates to techniques for detecting an object in an environment, determining a probability that the object is a region (e.g., cloud) of particulate matter, and controlling a vehicle based on the probability. The region of particulate matter may include steam (e.g., emitted from a man-hole cover, a dryer exhaust port, etc.), exhaust from a vehicle (e.g., car, truck, motorcycle, etc.), environmental gases (e.g., resulting from sublimation, fog, evaporation, etc.), a cloud of dust, or other types of particulate matter that may be located in the environment of the vehicle and may not impact driving behavior (e.g., autonomous vehicle may safely pass through the particulate matter without impact to the platform). Based on a first probability that the object is a region of particulate matter, a vehicle computing system may substantially maintain a vehicle trajectory, thereby improving the efficient operation of the vehicle. Based on a second probability that the object is a region of particulate matter, the vehicle computing system may modify a trajectory of the vehicle to ensure the vehicle does not impact the object, thereby enhancing safety for the vehicle and other objects in the environment.

The vehicle may include an autonomous or semi-autonomous vehicle that utilizes sensor data collected by one or more sensors to detect objects in an environment and navigate through the environment based on the objects. The sensor data captured by the vehicle may include data captured by a lidar sensor, as well as data captured by other sensors such as camera sensors, radar sensors, time-of-flight sensors, sonar sensors, and the like. In some examples, the sensor data can be provided to a perception system configured to determine or classify a type of an object (e.g., vehicle, pedestrian, bicycle, motorcycle, animal, parked car, tree, building, cloud of particulate matter, and the like) in the environment. In various examples, the perception system may identify one or more features associated with the object and determine the classification based on the one or more features. In various examples, the perception system may utilize the techniques described in U.S. patent application Ser. No. 16/023,878 filed Jun. 29, 2018 and entitled "Point Cloud Filtering with Semantic Segmentation," the entire contents of which are incorporated herein by reference. In some examples, the perception system may include a machine-learned model configured to identify the feature(s) and classify the object. In various examples, the perception system may provide a confidence associated with the classification. In such examples, the confidence may include a probability that the object is associated with the classification. For example, based on features associated with a detected object, the perception system may determine a 70% probability (or any probability) that the object is associated with (e.g., classified as) a region of particulate matter. In various examples, the object may not be identifiable as being associated with a particular type of object (e.g., not a pedestrian, car, truck, etc.). In such examples, the perception system may be configured to determine a probability that the object is associated with a region of particulate matter.

In some examples, the probability may be based on one or more features associated with the object. The feature(s) may include a location of the object in the environment (e.g., proximity to a surface, height above the surface, etc.), a size of the object (e.g., width, height, depth, etc.), a shape (e.g., symmetrical, asymmetrical, round, oblong, etc.), a proximity to another vehicle, a proximity to a location on another vehicle (e.g., location associated with exhaust, etc.), a track of the object (e.g., movement captured over time), or the like. For example, a vehicle computing system may detect an object in the environment and may determine that a bottom edge of the object is about six inches off a surface of a road and is within a threshold distance to another vehicle operating ahead of and on a same road segment as the vehicle. Based on the height characteristic and/or the threshold distance to another vehicle, the vehicle computing system may determine that the probability is high that the object is a region of particulate matter.

In various examples, the probability that an object is associated with a region of particulate matter may be based on map data accessed by the vehicle computing system. The map data may represent information about an environment in which the vehicle operates, based in part on pre-recorded sensor data from one or more vehicles. In some examples, the vehicle computing system may utilize the map data to navigate the vehicle through the environment. The map data may include data associated with drivable surfaces (e.g., streets, roads, sections of road, intersections, etc.) and/or known obstacles (e.g., fixed objects in the environment, etc.) in the environment. In some examples, the map data may additionally include known areas of particulate matter emission, such as manhole covers, dryer vents (e.g., industrial dryers, household dryers, etc.), and the like. In such examples, a probability that the object is associated with the region of particulate matter may be based in part on the known areas of particulate matter emission. For example, a vehicle computing system may identify an object at a location in an environment. The vehicle computing system may access map data to determine that the location has associated therewith a manhole cover that occasionally has associated particulate matter emission (e.g., steam from underground).

In various examples, the probability may be determined utilizing machine learning techniques. In such examples, a machine-learned model may be trained with training data to determine the probability that the object is associated with the region of particulate matter. The training data may include previously captured sensor data from one or more vehicles that is annotated to indicate a ground truth state of one or more regions of particulate matter present in an environment.

In various examples, the vehicle computing system may determine an action to take based on the probability that the object is associated with a region of particulate matter. The actions may include maintaining a course and speed (e.g., trajectory) associated with a path of the vehicle, slowing the vehicle to a pre-determined speed, slowing the vehicle to a stop, changing lanes, and/or adjusting a position in a lane. In various examples, the action may be determined based on the probability being above and/or below one or more thresholds. In some examples, the threshold(s) may be associated with various levels of probability, such as a high probability, medium probability, low probability, or the like. In such examples, the level of probability may have one or more actions associated therewith. For example, based on a determination that the probability is at or above a first threshold probability (e.g., high probability) that the object is associated with a region of particulate matter, the vehicle computing system may cause the vehicle to maintain a trajectory associated with a path of the vehicle. For another example, based on a determination that the probability is at or below the first threshold and at or above a second threshold (e.g., medium probability), the vehicle computing system may cause the vehicle to slow to a pre-determined speed (e.g., 5 miles per hour, 10 miles per hour, 15 kilometers per hour, etc.). For yet another example, based on a determination that the probability is at or below the second threshold, the vehicle computing system may cause the vehicle to stop, such as to avoid a collision with the object. Though these are merely illustrative examples, and other actions and/or levels of probability and actions associated therewith are contemplated.

In various examples, the action may be determined based on a cost associated with the action. In some examples, the vehicle computing system may identify one or more actions to take and may determine a cost (e.g., action cost) associated with each of the action(s). In various examples, the costs may be based on one or more of a safety cost (e.g., safety of the vehicle and/or object, avoiding a collision between the vehicle and the object), a comfort cost (e.g., lack of abrupt movements—e.g., by penalizing large magnitude accelerations, less than a minimum distance between the vehicle and the object), a progress cost (e.g., movement toward destination), an operational rules cost (e.g., rules of the road, laws, codes, regulations, etc.), or the like, such as that described in U.S. patent application Ser. No. 16/539,928 filed Aug. 13, 2019, entitled "Cost-Based Path Determination," the entire contents of which are incorporated herein by reference. In some examples, the action selected may include the action having associated therewith a lowest cost. In such examples, the action may be based on a cost optimization.

In various examples, the action may be determined based on a function associated with the probability that the object is associated with a region of particulate matter, a size of the region, a distance to the region, a vehicle speed, and/or any other factors associated with vehicular travel through the environment. In some examples, one or more factors (e.g., probability, size, distance, vehicle speed, etc.) may be weighted higher than others, such as to have a greater influence on the action selection. For example, the size of the region of particulate matter may be weighed higher than a distance to the region. The size may thus have a greater impact on the action selection than the distance to the region.

In various examples, the vehicle computing system may detect an object that may be associated with a region of particulate matter and may determine a distance to the object is above a threshold distance (e.g., 200 feet, 100 yards, 100 meters, etc.). The vehicle computing system may determine an initial probability that the object is associated with a region of particulate matter. Based on a determination that the initial probability is above a threshold probability (e.g., 95%, 99%, etc.), the vehicle may proceed along substantially the same trajectory (e.g., speed and/or direction). Based on a determination that the initial probability is below the threshold probability, the vehicle computing system may modify the trajectory of the vehicle. In some examples, the vehicle computing system may cause the vehicle to change lanes, adjust a position in a lane, or perform another action to avoid the object. In some examples, the vehicle computing system may cause the vehicle to slow to a pre-determined speed in order to capture additional data associated with the object. In such examples, the vehicle computing system may determine, based on the additional data, an updated probability that the object is associated with a region of particulate matter. For example, a vehicle computing system may detect an object located 100 meters ahead of a vehicle has associated therewith a 20% probability that the object is associated with a region of water. The vehicle computing system may determine that the 100-meter distance is above a threshold distance and the 20% probability is below a threshold probability, and may cause the vehicle to slow to 10 miles per hour in order to capture additional data associated with the object. The vehicle computing system may capture additional data and determine an updated probability of 90% that the object is associated with the region of particulate matter. Based on the determination of the updated probability, the vehicle computing system may cause the vehicle to proceed according to an original trajectory (e.g., trajectory prior to slowing).

In various examples, the vehicle computing system may detect an object that may be associated with a region of particulate matter. The vehicle computing system may determine that a probability that the object is associated with a region of particulate matter is below a threshold (e.g., not likely to be particulate matter). The vehicle computing system may determine a distance to the object and may determine a rate of deceleration (e.g., −3 miles per hour per second, −5 miles per hour per second, etc.) based on the distance. The rate of deceleration may be associated with a pressure applied to brakes of the vehicle, regenerative braking, down shifting, engine braking, or any other method of stopping the vehicle prior to reaching a location associated with the object. By determining the rate of deceleration based on the distance, the vehicle computing system can ensure that the vehicle does not contact the object, thereby greatly improving the safe operation of the vehicle. For example, the vehicle computing system may determine that an object located 25 feet in front of a vehicle has a low probability that it is associated with particulate matter. The vehicle computing system may cause the vehicle to slow at a rate of 15 feet per second per second to stop prior to the object. In some examples, the vehicle computing system may be configured to slow the vehicle at a maximum rate of deceleration (e.g., 20 feet per second per second, 25 feet per second per second, etc.) in order to minimize damage to the vehicle and/or object.

In some examples, based on a determination that the probability that the object is associated with a region of particulate matter is below the threshold, the vehicle computing system may determine a lateral acceleration (e.g., 2 meters per second$^2$, 8 feet per second$^2$, etc.) necessary to avoid the object. In such example, the vehicle computing system may be configured to cause the vehicle to adjust a position of the vehicle laterally (e.g., swerve) out of a path that may intersect the object. In various examples, the vehicle may determine that a lateral path is clear of other objects prior to or substantially simultaneously with the determination of lateral acceleration. In some examples, the determination to adjust a position laterally (e.g., change lanes, swerve away from the object, etc.) may be based on a distance to the object being less than a threshold distance (e.g., 30 meters, 40 feet, etc.). In some examples, the threshold distance may include a threshold stopping distance. In such examples, the vehicle computing system may determine that stopping the vehicle prior to the object is not a viable option, but a positional adjustment may be used to avoid the object. For example, the vehicle computing system may determine that the object is 15 feet ahead of the vehicle traveling 25 miles per hour and that, at a maximum rate of deceleration, the vehicle will not be able to stop prior to the object. The vehicle computing system may thus determine a lateral acceleration necessary to swerve into an adjacent lane and avoid the object.

The techniques discussed herein can improve autonomous vehicle control a number of ways. For instance, traditional autonomous vehicle controllers may rely heavily on lidar to detect and avoid objects in an environment. Particulate matter in the environment, such as generated by exhaust, steam, or environmental factors such as evaporation and sublimation, may generate returns on light beams associated with the lidar. The returns may cause the lidar to detect an object that may be otherwise unidentifiable to the autonomous vehicle controller. To avoid the unidentified object, the autonomous vehicle controller may cause the vehicle to brake and/or stop to avoid the object, which may result in unstable and/or inconsistent vehicle travel. Conversely, the techniques described herein detect the unidentified object, determine a probability that the object is associated with particulate matter, and control the vehicle based on the probability. As such, the techniques described herein result in improved control of the autonomous vehicle by making it more effective and efficient. Additionally, by relying on a probability generated utilizing many detected features in the environment, the vehicle computing system may enhance the safety associated with autonomous vehicle operation.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Additionally, the techniques described herein can be used with real data (e.g., captured using sensor(s)), simulated data (e.g., generated by a simulator), or any combination of the two.

FIG. 1 is an illustration of an environment 100 in which one or more computing systems 102 of an autonomous vehicle 104 (e.g., vehicle 104) may detect objects 106 and control the vehicle 104 based on a probability that the objects 106 are associated with regions of particulate matter 108, in accordance with examples of the disclosure. The autonomous vehicle 104 may detect the objects 106 based on sensor data captured by one or more sensors 110 of the vehicle 104. The sensor data captured by the sensor(s) 110 may include data captured by a lidar sensor, as well as data captured by other sensors such as camera sensors, radar sensors, time-of-flight sensors, sonar sensors, and the like. In at least one example, the sensor data may include lidar data comprising light signals reflecting off an object 106. In such an example, the light signals may reflect off water molecules present in one or more regions of particulate matter 108.

In some examples, the sensor data can be provided to a perception component 112 configured to determine a classification associated with the object 106 (e.g., vehicle, pedestrian, bicycle, motorcycle, animal, parked car, tree, building, region of particulate matter, and the like). In various examples, the perception component 112 may determine an object classification based on one or more features associated with the object 106. The features may include a size of the object 106 (e.g., width, height, depth, etc.), shape (e.g., geometry, symmetry, etc.), a location of the object 106 (e.g., proximity to a surface, height above the surface, etc.), a track of the object 106 (e.g., movement over time, speed, direction, etc.), proximity to another object 106, proximity to a location on another vehicle (e.g., location associated with exhaust, etc.), or the like. For example, the perception component 112 may recognize the shapes, and sizes, and tracks of associated with objects 106(4) and 106(5) and may determine that the objects 106(4) and 106(5) are cars. For another example, the perception component 112 may determine that the shapes, locations, sizes, and tracks associated with objects 106(1), 106(2), and 106(3) are those associated with regions of particulate matter.

In various examples, the perception component 112 may utilize one or more machine-learned models configured to output classifications based on the features associated with the objects 106. In some examples, the machine-learned models may be configured to output a probability that the object is associated with the classification (e.g., confidence that the object is classified correctly). In such examples, the machine-learned models may be trained utilizing training data including annotated features associated with regions of particulate matter 108, such as those captured by one or more vehicles 104 in pre-recorded sensor data. For the purposes of this discussion, the focus will be on determining the probability that an object 106, such as objects 106(1), 106(2), and 106(3) are associated with regions of particulate matter. However, the perception component 112 may be configured to perform the same or similar determinations of confidence (e.g., probability) with respect to objects 106 with other classifications.

In various examples, the probability that the object 106 is associated with a region of particulate matter 108 (e.g., cloud of particulate matter, area of particulate matter, etc.) may be based on the feature(s) associated with the object 106. For example, a perception component 112 may detect an object 106(1) in the environment and may determine that a bottom edge of the object 106(1) is at a height (H) of about six inches off a drivable surface 114 of a road and is within a threshold distance to another vehicle (e.g., object 106(4)) operating ahead of and on a same road segment as the vehicle 104. Based on the height characteristic and/or the threshold distance to another vehicle, the vehicle computing system may determine that the probability is high (e.g., 93%) that the object is a region of particulate matter. In some examples, the probability may be increased based on the number of feature(s) that match those associated with the region of particulate matter 108.

In various examples, the probability that an object 106 is associated with a region of particulate matter 108 may be based on map data accessed by the perception component 112. The map data may represent information about the environment 100, based in part on pre-recorded sensor data from one or more vehicles. The map data may include data associated with drivable surfaces 114 (e.g., streets, roads, sections of road, intersections, etc.), known obstacles (e.g., fixed objects in the environment, etc.), and/or other surfaces (e.g., sidewalk, etc.) in the environment. In various examples, the map data may additionally include known areas of particulate matter emission, such as area 116. The known areas 116 of particulate matter emission may include manhole covers, dryer vents (e.g., industrial dryers, household dryers, etc.), and the like. In such examples, a probability that the object is associated with the region of particulate matter may be based in part on the known areas of particulate matter emission. For example, a vehicle computing system may identify an object at a location in an environment. The sewer drains, or the like. For example, multiple vehicles may travel through the environment 100 and capture sensor data including a region of particulate matter 108(3) emitted from the drivable surface 114 at a location. A computing system configured to generate map data (e.g., vehicle computing system, remote computing system, etc.) may determine, based on the sensor data captured from multiple vehicles, that the region of particulate matter 108(3) is associated with a known area 116 of particulate matter emission.

In some examples, the perception component 112 may compare a location associated with the object 106 and determine that the probability that the object 106 is associated with a region of particulate matter 108 is increased based on proximity to the known area 116 of particulate matter emission. For example, the perception component 112 may detect object 106(3) in the environment 100. The perception component 112 may access map data to determine that a location associated with the known area 116 of particulate matter emission is proximate the object 106(3) (e.g., within a threshold distance, emitted from, etc.). The perception component 112 may determine, based in part on the known area 116 of particulate matter emission, that the object 106(3) has a high probability (e.g., 90%, 95%, etc.) of being associated with a region of particulate matter 108(3).

In various examples, the probability that an object 106 is associated with a region of particulate matter 108 may be based on a track 118 associated therewith. In various examples, the perception component 112 may collect perception data over a period of time and determine a track 118 associated with the object 106. The track 118 may include the detected movement of the object 106 over the period of time, such as the distance traveled, speed, etc. The perception component 112 may determine the probability based in part on the track 118. In the illustrative example, the perception component 112 may detect the object 106(2) as it moves over time along the track 118. Based in part on the movement of the object 106(2), the perception component 112 may determine that the object 106(2) is associated with a region of particulate matter 108(2).

In various examples, the probability may additionally or alternatively be based in part on the shape of the object 106(2) and/or the size of the object 106(2) along the track 118. In such examples, the perception component 112 may identify the dissipation of particulate matter and a decrease in size of the object 106(2) over time. In various examples, the perception component 112 may determine the probability that the object 106(2) is associated with the region of particulate matter 108(2) based on the shape and/or size of the object 106(2) along the track 118.

In various examples, a planning component 120 of the vehicle 104 may be configured to receive data from the perception component 112 and control the vehicle 104 based on the data. In various examples, the data may include a classification of an object 106 as a region of particulate matter 108 and/or a probability that the object 106 is associated with the region of particulate matter 108. In various examples, the planning component 120 may determine an action to take based on the probability that the object 106 is associated with the region of particulate matter 108. The action may include maintaining a course and speed (e.g., a trajectory) associated with a path of the vehicle 104, slowing the vehicle 104 to a predetermined speed (e.g., 10 miles per hour, 20 kilometers per hour, etc.), stopping the vehicle 104, changing lanes, and/or adjusting a position in a lane. In various examples, the planning component 120 may determine one or more trajectories for the vehicle 104 to travel based on the action.

In various examples, the action may be determined based on the probability being above and/or below one or more threshold probabilities. In some examples, the threshold(s) may be associated with various levels of probability, such as high probability, medium probability, low probability, and the like. In some examples, each level of probability (e.g., probability above/below different thresholds) may have associated therewith one or more actions. For example, based on a determination that there is a high probability that an object 106(3) is associated with a region of particulate matter 108(3) (e.g., probability at or above a first threshold), the planning component 120 may determine that the action includes maintaining a course and speed (e.g., maintain a trajectory) of the vehicle 104. For another example, based on a determination that there is a low probability that the object 106(3) is associated with a region of particulate matter 108(3) (e.g., probability at or below a second threshold), the planning component 120 may determine that the action includes stopping the vehicle. For yet another example, based on a determination that there is a medium probability that the object 106(3) is associated with a region of particulate matter 108(3) (e.g., probability at or below the first threshold and at or above the second threshold), the planning component 120 may determine to slow the vehicle to a pre-determined speed (e.g., 15 kilometers per hour, 9 miles per hour, etc.).

In various examples, the planning component 120 may be configured to determine an action for the vehicle 104 to take based on a function corresponding to the probability that the object(s) 106 is associated with a region of particulate matter, a size of the region, a distance to the region, a vehicle speed, a width of a lane associated with a vehicle trajectory and/or an additional buffer (e.g., safety buffer, distance to maintain from an object 106, etc.), and/or any other factors associated with vehicular travel through the environment. In some examples, one or more factors (e.g., probability, size, distance, vehicle speed, etc.) may be weighted higher than others, such as to have a greater influence on the action selection. For example, the size of the region of particulate matter may be weighed higher than a distance to the region. The size may thus have a greater impact on the action selection than the distance to the region.

In various examples, the planning component 120 may be configured to determine two or more actions the vehicle 104 could take based on the probability and may select an action based on a cost analysis associated with each action, such as utilizing the techniques described in U.S. patent application Ser. No. 16/539,928 filed Aug. 13, 2019 incorporated herein above. In at least some such examples, such costs may include, for example, a cost based on a width available in the lane (e.g., such that the cost increases exponentially relative to a width of the vehicle and/or an additional buffer). As a non-limiting example, the cost may be polynomialy, exponentially, or otherwise a function of a width of a lane relative to a threshold width. In some examples, such a cost may be based on a distance to nearest objects, which may include boundaries of the drivable surface.

In some examples, the cost associated with safety (e.g., safety cost) may be based on a probability of collision between the vehicle 104 and the object(s) 106. In some examples, the safety cost may include a fixed cost (e.g., 60, 80, 100, etc.) if a probability of collision is greater than a predefined threshold indicating that a collision is likely (e.g., 40%, 51%, etc.). In some examples, the fixed cost may include a cost value above a threshold such that the vehicle computing system could not select the action associated therewith. In such examples, the probability of collision may include a constraint on actions the vehicle 104 may take. In various examples, the safety cost may include a function of the probability that the object 106 is associated with a region of particulate matter 108. For example, the safety cost may increase as a probability that the object 106 is associated with the region of particulate matter 108 decreases. In some examples, the safety cost may be based on relative positions and/or trajectories/tracks of the vehicle 104 and the object(s) 106. In such examples, the safety cost may increase the closer a vehicle 104 (traveling on a vehicle trajectory) gets to the object(s) 106.

In various examples, a comfort cost may be associated with an estimated acceleration (e.g., positive, negative, lateral, etc.) and/or an estimated change in acceleration (e.g., jerk) associated with a vehicle trajectory determined responsive to detection of the object(s) 106. In some examples, the comfort cost may be associated with a distance between the vehicle 104 performing the associated action and the object(s) 106. In such examples, the comfort cost may be associated with a closest point of approach between the vehicle 104 and the object(s) 106. In some examples, the comfort cost may be associated with a passing speed associated with the action. In some examples, the comfort cost may be associated with a relative speed between the vehicle 104 and the object(s) 106. In other examples, any other state/control of the vehicle 104 and/or considered objects 106 may be used in determining the comfort cost (e.g., how close to other vehicles—as may be computed as a nearest neighbors, or next nearest neighbors, steering rates, rotation rates, velocities, and the like).

In various examples, a progress cost may include the progress of the vehicle 104 moving toward a destination. In some examples, the progress cost may be calculated based on a change in velocity of the vehicle 104 and/or a delay of the vehicle 104 caused by the vehicle stopping, slowing down, etc. In some examples, the progress cost may include a value substantially similar to the number of seconds of delay attributed to the action. In such examples, an action including slowing and/or stopping the vehicle prior to the location associated with the object(s) 106 may be associated with a higher progress cost than that associated with an action including navigation around the object(s) 106.

In various examples, an operational rules cost may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an action may be calculated based on one or more rules that are broken and/or satisfied. In such examples, the operational rules cost may be increased based on rules (e.g., regulations, habits, courtesies, etc.) that are broken or unfulfilled and/or decreased based on rules that are satisfied or fulfilled. For example, an action associated with changing a lane into oncoming traffic may include breaking a rule that the vehicle 104 should remain in a lane designated for traffic operating in a direction associated with a planned vehicle trajectory (e.g., original vehicle path, trajectory, etc.). The action may include a higher operational rules cost than an action involving a positional adjustment of the vehicle 104 in the lane.

In various examples, the operational rules cost may be determined based rules, regulations, etc. associated with a lane marker corresponding to the lane in which the vehicle is traveling (e.g., during detection of the object(s) 106). In such examples, the color of the lane marker and/or whether the lane marker is solid and/or broken may contribute to the operational rules cost associated with an action. For example, an action associated with crossing a double yellow line may have a high operational rules cost (e.g., 40, 50, etc.) associated therewith. For another example, a broken white line may have a low operational rules cost (e.g., 5, 10, etc.) associated therewith.

In various examples, the costs may be ranked or weighted in order of importance. In some examples, the at least one of the costs (e.g., safety, comfort, progress, operational rules) may include a cost that is weighed higher than the other costs. For example, safety may be weighed higher than other factors. In such an example, the planning component 120 may emphasize safety above other factors in a determination of an action for the vehicle 104 to take.

In some examples, the planning component 120 may determine the action to take based on a lowest cost associated therewith. In such examples, the action may be based on a cost optimization. For example, the planning component 120 may receive an indication that the probability that an object 106(1) is associated with a region of particulate matter 108(1) is 70%. The planning component 120 may determine that the 70% probability is below a first threshold probability and above a second threshold probability. Based on this determination, the planning component 120 may determine that the vehicle 104 may perform a first action including slowing to a predetermined speed or a second action including a lane change to avoid the object 106(1). The planning component 120 may determine that a cost associated with slowing the vehicle 104 is less than the cost associated with changing lanes and may cause the vehicle 104 to slow to the predetermined speed based on the cost analysis.

In various examples, the perception component 112 may provide the planning component 120 with a distance (D) between the vehicle 104 and the object 106(1) in addition to the probability that the object 106(1) is associated with a region of particulate matter 108(1). In various examples, the planning component 120 may determine that the distance (D) is above a threshold distance (e.g., 150 feet, 80 meters, etc.). In some examples, the threshold distance may include a pre-determined threshold distance programmed into the computing system(s) 102. In some examples, the threshold distance may be dynamically determined based on one or more factors, such as vehicle speed, speed limit associated with the drivable surface 114, a number of detected objects 106, types of objects 106 detected in the environment 100, weather (e.g., rain, snow, fog, etc.), an area or zone associated with the environment (e.g., school zone, residential area, construction zone, etc.), or the like.

In some examples, based on a determination that the distance (D) is above the threshold distance, the planning component 120 may determine that the probability corresponds to an initial probability. In various examples, based on a determination that the initial probability is at or above a threshold probability (e.g., 91%, 99%, etc.), the planning component 120 may cause the vehicle 104 to maintain a trajectory. In such examples, the vehicle 104 may maintain a course and speed associated with a planned vehicle path through the environment 100. For example, the planning component 120 may determine, with a high probability, that the object 106(1) is associated with a region of particulate matter 108(1). The planning component 120 may thus maintain the vehicle trajectory to operate though the region of particulate matter 108(1).

In some examples, based on a determination that the initial probability is at or below the threshold probability, the planning component 120 may cause the vehicle 104 to reduce speed (e.g., slow down). In such examples, the reduced speed may provide time for the perception component 112 to gather additional data regarding the object 106 to determine an updated probability. In some examples, the speed may be dynamically determined, such as based on one or more of the factors described above (e.g., vehicle speed, speed limit, weather, etc.). In various examples, the speed may include a pre-determined speed (e.g., 10 miles per hour, 8 miles per hour, 18 kilometers per hour, etc.), such as that programmed into the computing system(s) 102. In some examples, the pre-determined speed may be based on one or more safety factors, such as a minimized impact on a passenger of the vehicle 104, the object 106, or the like, so as to maximize the safe operation of the vehicle 104.

In various examples, the planning component 120 may receive an updated probability after a period of time (e.g., 0.1 seconds, 0.5 seconds, 1 second, etc.). In some examples, the updated probability may be based on data captured between a first time associated with the initial probability and a second time associated with the updated probability. In some examples, the updated probability may be associated with data captured at the second time, such as at a fraction of the distance (D). In various examples, the planning component 120 may compare the updated probability with one or more thresholds to determine an action for the vehicle 104 to take. For example, based on a determination that the updated probability is at or above an upper threshold, the planning component 120 may cause the vehicle to accelerate back to an initial speed (e.g., speed prior to slowing down, speed associated with the planned vehicle path through the environment 100, etc.). For another example, based on a determination that the updated probability is at or below an upper threshold and that an adjacent lane is clear, the planning component 120 may determine to cause the vehicle 104 to change lanes into the adjacent lane, such as to avoid the object 106(1). For yet another example, based on a determination that the updated probability is at or below a lower threshold, the planning component 120 may cause the vehicle to stop prior to the object 106(1) (e.g., avoid a collision with the object 106(1)).

In various examples, the planning component 120 may receive the distance (D) between the vehicle 104 and the object 106(1) and may determine that the distance (D) is less than the threshold distance, such that it is not sufficient to capture additional data and determine an updated probability. In some examples, planning component 120 may receive the probability that the object 106(1) is associated with the region of particulate matter 108(1). Based on a determination that the probability is less than a threshold probability (e.g., low probability), the planning component 120 may determine to cause the vehicle to stop prior to the object 106(1), such as to avoid a collision therewith.

In various examples, the planning component may determine a rate of deceleration (e.g., negative acceleration) (e.g., −3 miles per hour per second, −5 miles per hour per second, etc.) based on the distance (D) between the vehicle 104 and the object 106(1). The rate of deceleration may be associated with a pressure applied to one or more brakes of the vehicle 104, regenerative braking, down shifting, engine braking, or any other method of stopping the vehicle 104 prior to reaching a location associated with the object 106(1). By determining the rate of deceleration based on the distance (D), the planning component 120 can ensure that the vehicle 104 does not contact the object 106(1), thereby greatly improving the safe operation of the vehicle 104. For example, the planning component 120 may determine that the distance (D) between the vehicle and the object 106(1) is 35 feet and that there is a low probability that the object 106(1) is associated with a region of particulate matter 108(1). The planning component 120 may cause the vehicle 104 to slow at a rate of 15 feet per second per second to stop prior to the object 106(1).

In some examples, the planning component 120 may be configured to slow the vehicle at a maximum rate of deceleration (e.g., 20 feet per second per second, 25 feet per second per second, etc.). In such examples the maximum rate of deceleration may be based on a maximum amount of pressure capable of being applied to the brakes, maximum regenerative braking, lowest down shift, maximum engine braking, or the like such as to slow the vehicle 104 as much as possible prior to the location in order to minimize damage to the vehicle 104 and/or the object 106(1).

In various examples, based on a determination that the probability that the object 106(1) is associated with a region of particulate matter 108(1) is below the threshold, the planning component 120 may determine to adjust a position laterally, such as to avoid the object 106(1). In some examples, a determination to move laterally may be based on a determination that a lateral path is clear of objects 106, such as other vehicles, motorcycles, bicyclists, or the like. In such examples, the determination that the lateral path is clear may be based on sensor data and/or an indication from the perception system that at least a threshold area of an adjacent lane is clear of objects 106. The threshold area may be associated with an area necessary to transition into an adjacent lane without encroaching within a threshold distance in front of or behind an object 106. For example, the threshold area may ensure that the vehicle 104 would not cut off another vehicle operating in an adjacent lane. For another example, the threshold area may ensure that the vehicle 104 does not change lanes to follow behind another vehicle at an uncomfortable distance (e.g., less than 5 feet, etc.).

In some examples, a determination to move laterally, such as to swerve out of the path that may intersect the object 106(1), may be based on the distance (D) and/or speed of the vehicle 104. In such examples, if the distance (D) between the vehicle 104 and the object 106(1) is less than a threshold and/or less than necessary to stop the vehicle 104 (traveling at a particular speed) prior to reaching the location associated with the object 106(1), the planning component 120 may cause the vehicle 104 to move laterally. For example, the planning component 120 may determine that the distance (D) to the object 106(1) is 15 feet in front of the vehicle 104 that is traveling 20 miles per hour and that, at a maximum rate of deceleration, the vehicle 104 is not able to stop prior to the object 106(1). The planning component 120 may thus determine a lateral acceleration necessary to swerve into an adjacent lane and avoid the object 106(1). In some examples, the lateral acceleration, maximum rate of deceleration, and/or determination to move laterally may be based on a cost-based analysis, such as that described above. In such examples, the determination to swerve out of the path of the object 106(1) and/or the lateral acceleration associated with the movement may be based on one or more of a safety cost, a comfort cost, a progress cost, and/or an operational rules cost associated with the action.

In various examples, the planning component 120 may determine a lateral acceleration (e.g., 2 meters per second per second, 8 feet per second per second, etc.) associated with the lateral movement, such as that necessary to avoid the object 106(1). The lateral acceleration may be based on the distance (D) and/or the speed of the vehicle 104. In such examples, the closer an object 106(1) is to the vehicle 104 and/or the faster the vehicle 104 travels through the environment 100, the greater the lateral acceleration needed to avoid the object 106(1).

Figure 2:
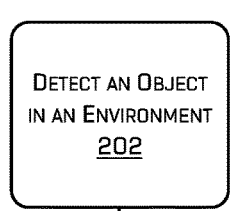
FIG. 2 is an example process for controlling a vehicle based on a probability that an object in a path of the vehicle is associated with a region of particulate matter, in accordance with examples of the disclosure.
Figure 2:
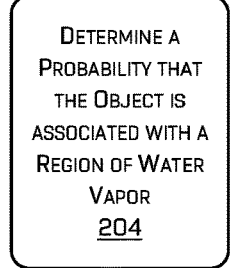
Figure 2:
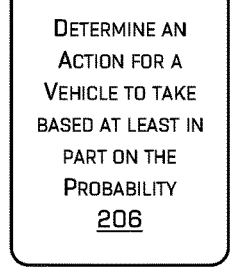
Figure 2:
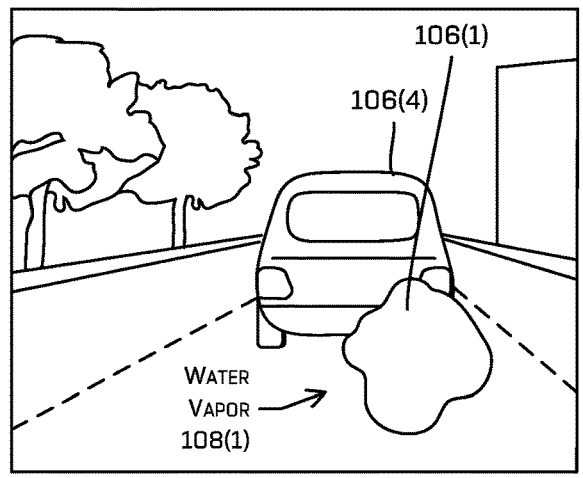
Figure 2:
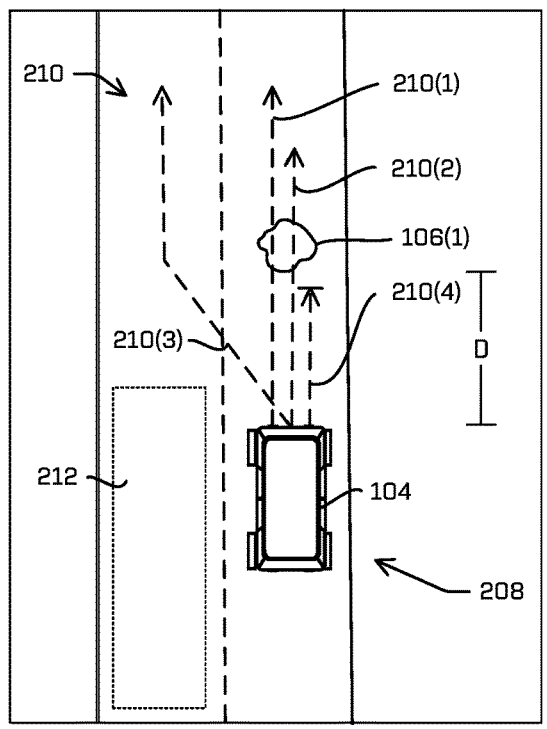

FIG. 2 is an example process 200 for controlling a vehicle 104 based on a probability that an object 106(1) in a path of the vehicle is associated with a region of particulate matter 108(1), in accordance with examples of the disclosure.

An operation 202 includes detecting objects 106(1) and 106(4) in an environment 100. In various examples, the objects 106(1) and 106(4) may be detected based on data captured from one or more sensors. The sensor data captured by the sensor(s) may include data captured by a lidar sensor, as well as data captured by other sensors such as camera sensors, radar sensors, time-of-flight sensors, sonar sensors, and the like. In at least one example, the sensor data may include lidar data comprising light signals reflecting off the objects 106(1) and 106(4). In some examples, the light signals may reflect off water molecules present in a region of particulate matter 108(1).

In various examples, a vehicle computing system, such as computing system(s) 102, may be configured to determine a classification associated with the objects 106(1) and 106(4). The classification may include a class or type associated with the objects 106(1) and 106(4), such as pedestrian, car, truck, bicyclist, moped, train, region of particulate matter (e.g., cloud), or the like. As an illustrative example, the vehicle computing system may identify the object 106(4) as a car and the object 106(1) as a region of particulate matter. In some examples, the vehicle computing system may process lidar returns (e.g., light reflecting off the object 106(1)), but may be unable to determine a classification associated with an object, such as object 106(1). In such examples, based on a lack of classification, the vehicle computing system may determine that the object 106(1) may comprise a region of particulate matter 108(1).

An operation 204 may include determining a probability that the object is associated with the region of particulate matter 108(1). In various examples, the probability may include a confidence that the object 106(1) is classified correctly as a region of particulate matter 108(1). In such examples, the vehicle computing system may determine the confidence (e.g., probability) substantially concurrently with the classification. In some examples, the probability may represent a probability that, absent a classification, the object 106(1) comprises the region of particulate matter 108(1). In such examples, the probability may include a likelihood that the object 106(1) is particulate matter 108(1).

In various examples, the vehicle computing system may determine the probability based on one or more features associated with the object 106(1). The feature(s) may include a location of the object 106(1) in the environment (e.g., proximity to a surface, height above the surface, etc.), a size of the object 106(1) (e.g., width, height, depth, etc.), a shape (e.g., symmetrical, asymmetrical, round, oblong, etc.), a proximity of the object 106(1) to a vehicle, such as object 106(4) (e.g., proximity to an exhaust producing vehicle (e.g., gasoline or diesel powered car, truck, etc.)), a proximity to a location on the other vehicle (e.g., location associated with exhaust, etc.), a track of the object 106(1) (e.g., movement captured over time), or the like. For example, the vehicle computing system may detect the object 106(1) and determine, based on a cloud-like shape and a proximity to object 106(4), that there is an 80% probability that the object 106(1) is associated with a region of particulate matter 108(1).

In some examples, the vehicle computing system may determine the probability based on map data associated with the environment 100. The map data may represent information about the environment 100 in which the vehicle operates. In some examples, the map data may be generated based on pre-recorded sensor data from one or more vehicles 104. The map data may include data associated with drivable surfaces (e.g., streets, roads, sections of road, intersections, etc.) and/or known obstacles (e.g., fixed objects in the environment, etc.) in the environment. In some examples, the map data may additionally include known areas of particulate matter emission, such as manhole covers, dryer vents (e.g., industrial dryers, household dryers, etc.), and the like. In such examples, a probability that the object 106(1) is associated with the region of particulate matter 108(1) may be based in part on the known areas of particulate matter emission.

In various examples, the vehicle computing system may determine the probability utilizing machine learning techniques. In such examples, a machine-learned model may be trained with training data to determine the probability that the object 106(1) is associated with the region of particulate matter 108(1). In some examples, the training data may include pre-recorded sensor data annotated with identified regions of particulate matter, such as region of particulate matter 108(1). In some examples, the annotations may include the feature(s). In various examples, the machine-learned model may be trained to identify the region of particulate matter 108(1) based on map data, such as that described above.

An operation 206 includes determining an action 210 for the vehicle to take based at least in part on the probability. In various examples, the vehicle computing system may determine a trajectory (e.g., initial trajectory, first trajectory, etc.) of the vehicle, such as determined at a time associated with an initial position 208. The initial trajectory may include a direction of travel and speed (or speeds) associated with the vehicle traveling through the environment, such as along a path to a destination. In various examples, the action 210, such as first action 210(1), may include maintaining the initial trajectory. In some examples, the vehicle computing system may cause the vehicle to perform the first action 210(1) based on a determination that the probability that the object 106(1) is associated with the region of particulate matter 108(1) is above a first threshold probability (e.g., 95%, 98%, etc.). In such examples, the vehicle computing system may determine that, due to the high probability that the detected object 106(1) comprises particulate matter, the vehicle 104 may be able to safely proceed along the initial trajectory to a destination.

In various examples, the action 210, such as actions 210(2), 210(3), and 210(4) may include modifying the trajectory to a second (modified) trajectory. In the illustrative example, a second action 210(2) includes modifying the trajectory by reducing a speed associated therewith (e.g., as compared to the initial trajectory). In various examples, the modified (or second) speed associated with the modified trajectory may include a pre-determined speed (e.g., 9 miles per hour, 15 kilometers per hour, etc.). In such examples, the pre-determined speed may be associated with a safety protocol for vehicle operations, thereby ensuring maximizing safety for the vehicle, vehicle occupants, and others operating in the environment 100. In some examples, the speed associated with the modified trajectory may be dynamically determined based on one or more factors. The factors may include vehicle 104 speed, speed limit associated with environment 100, a number of detected objects 106, types of objects 106 detected in the environment 100, weather (e.g., rain, snow, fog, etc.), an area or zone associated with the environment 100 (e.g., school zone, residential area, construction zone, etc.), or the like. In such examples, the vehicle computing system may determine a safe speed at which to approach the object 106(1) in the environment 100, thereby ensuring safe operations in any condition (e.g., different environments, weather, etc.). For example, the vehicle computing system may detect the object 106(1) and determine that the vehicle 104 is in a school zone. Based on the school zone, the vehicle computing device may cause the vehicle to slow to 7 miles per hour, to allow the vehicle to continue forward progress, but be capable of stopping in a very short distance, if necessary for safety reasons.

In some examples, the vehicle computing system may determine to perform one or more of the second action 210(2), the third action 210(3), and/or the fourth action 210(4) based on a cost analysis. In such examples, the vehicle computing system may calculate a cost (e.g., safety cost, comfort cost, progress cost, and/or operational rules cost, etc.) associated with each action and may select a lowest-cost action to perform. In some examples, the vehicle computing system may select an action for the vehicle 104 to take based at least in part on cost optimization.

In various examples, the vehicle computing system may determine to perform the second action 210(2) based on a determination that the probability is less than the first threshold probability. In some examples, the second action 210(2) may be performed responsive to a determination that the probability is less than the first threshold distance and greater than or equal to a second threshold (e.g., 50%, 60%, etc.). In such examples, the vehicle computing may cause the vehicle 104 to slow based on a determination that a medium probability exists that the object 106(1) is associated with the region of particulate matter 108(1).

In various examples, the vehicle computing system may determine to perform the second action 210(2) based in part on a distance (D) between the vehicle 104 and the object 106(1). In some examples, based on a determination that the distance (D) is above a threshold distance (e.g., 100 feet, 100 meters, etc.), the vehicle computing system may cause the vehicle 104 to perform the second action 210(2). In such examples, the vehicle computing system may be configured to gather additional data with respect to the object 106(1) to determine an updated probability that the object 106(1) is associated with the region of particulate matter 108(1). In some examples, the vehicle computing system may determine a high confidence, based on the updated probability, that the object 106(1) is associated with the region of particulate matter 108(1). Based on the updated probability, the vehicle computing system may cause the vehicle 104 to resume the initial trajectory and/or determine an updated trajectory for the vehicle 104 to travel through the environment 100 to the destination. For example, the vehicle computing system may determine that the updated trajectory is above the first threshold probability and may cause the vehicle to accelerate to a speed associated with the initial trajectory and/or another trajectory associated with vehicle 104 progressing to the destination.

In various examples, the vehicle computing system may cause the vehicle to slow at a pre-determined rate of deceleration (e.g., 3 feet per second per second, 2 meters per second per second, etc.) from the initial trajectory to the modified trajectory associated with the second action 210(2). The rate of deceleration may be associated with an amount of pressure applied to the brakes of the vehicle, regenerative braking, down shifting, engine braking, or any other method slowing the vehicle to the speed associated with the modified trajectory. In some examples, the vehicle computing system may determine a rate of deceleration based on the probability. For example, the vehicle computing system may slow the vehicle at 5 feet per second per second based on a determination that the probability is 50%, and 3 feet per second per second based on a determination that the probability is 80%. In at least some examples, such decelerations may not be predetermined, but based at least in part on the probability, relative location of the steam, and the like.

Additionally or in the alternative to slowing a forward speed of the vehicle 104 and as illustrated as a third action 210(3), the vehicle computing system may modify a direction of travel associated with the initial trajectory. Though illustrated as a lane change, the third action 210(3) may include any other safe lateral maneuver to permit navigation around the object 106(1), such as modifying a position in a lane, partially or completely operating on a shoulder of the road, or the like. In some examples, the vehicle computing system may cause the vehicle 104 to perform the third action 210(3) based on a probability being below the first threshold probability. In some examples, the third action 210(3) may be selected based on the probability being below the first threshold and above a second threshold. In such examples, the vehicle computing system may cause the vehicle to perform the third action 210(3) based on a medium probability that the object 106(1) is associated with the region of particulate matter 108(1). Of course, though described in terms of thresholds herein, this is not meant to be so limiting. For instance, while some examples may set fixed thresholds for decision-making, it should be understood that any discussion of thresholds herein may also refer to cost expressions set up in such a way such that a transition occurs between two outcomes based on an optimization over the cost at or about such a threshold. In various examples, combinations of hard constraints (e.g., fixed threshold for decisions), as well as thresholds as representing transitions in a cost-optimization are contemplated.

In various examples, the vehicle computing system may determine that a lateral path (e.g., adjacent lane) is clear of other vehicles, motorcycles, bicyclists, or the like. In some examples, the determination that the lateral path is clear may be based on sensor data and/or an indication from the perception system that at least a threshold area 212 of an adjacent lane (or other operating area, such as a shoulder, etc.) is clear (e.g., not occupied). In some examples, the threshold area 212 may be associated with an area necessary to transition into an adjacent lane without encroaching within a threshold distance in front of or behind an object 106. For example, the threshold area 212 may ensure that the vehicle 104 would not disrupt travel of another vehicle (e.g., cut-off, etc.) operating in an adjacent lane. In some examples, verifying that the threshold area 212 is clear may ensure that the vehicle 104 does not encroach upon other operators (e.g., other vehicles, motorcycles, bicyclists, etc.), such as if the vehicle 104 adjusts a position in a lane to be closer to the adjacent lane. In such examples, the techniques described herein may ensure minimal impact of the vehicle 104 travel on other operators, both in safety and comfort.

In various examples, the vehicle computing system may determine a lateral acceleration (e.g., 1 meters per second per second, 5 feet per second per second, etc.) associated with the third action 210(3). In some examples, the lateral acceleration may include a pre-determined lateral acceleration (e.g., 3 feet per second per second, 1 meter per second per second, etc., such as that designated for lane change maneuvers. In some examples, the lateral acceleration may be determined dynamically based on the one or more factors associated with the environment 100, such as the vehicle 104 speed, speed limit, weather, an area or zone, or the like. In various examples, the lateral acceleration may be based on the distance (D) between the vehicle 104 and the object 106(1) and/or the speed of the vehicle 104. In such examples, the closer an object 106(1) is to the vehicle 104 and/or the faster the vehicle 104 travels through the environment 100, the greater the lateral acceleration.

In various examples, the vehicle computing system may cause the vehicle 104 to modify the initial trajectory to stop the vehicle 104 prior to a location associated with the object 106(1), such as depicted in FIG. 2 as a fourth action 210(4). In some examples, a determination to perform the fourth action 210(4) may be based on a probability being below a second (or low) threshold (e.g., 25%, 10%, etc.). In such examples, based on a determination that there is a low probability that the object 106(1) is associated with the region of particulate matter 108(1), the vehicle computing system may cause the vehicle 104 to stop prior to a location associated with the object 106(1).

In various examples, the vehicle computing system may determine a rate of deceleration (e.g., negative acceleration) (e.g., −6 miles per hour per second, −10 miles per hour per second, etc.) for the vehicle 104. In some examples, the rate of deceleration may include a pre-determined rate. The pre-determined rate may include a rate of deceleration that is stored in the vehicle computing system for use when a vehicle 104 should be stopped prior to a location associated with the object 106(1). In some examples, the pre-determined rate may include a fixed rate of deceleration. In some examples, the vehicle computing system may cause a fixed amount of pressure to be applied to the brakes based on a determination to perform the fourth action 210(4). In some examples, the vehicle computing system may cause a pre-determined amount of engine braking (e.g., pre-determined revolutions per minute, etc.), pre-determined down-shift (e.g., reduction of one gear, two gears, etc.), or the like. In some examples, the pre-determined rate may be based on the distance (D) and/or speed of the vehicle 104. For example, for a distance of 20 feet and speed of 25 miles per hour, the vehicle computing device may determine that the rate of deceleration should be 20 feet per second per second.

In various examples, the rate of deceleration may be dynamically determined based on the distance (D) and one or more factors associated with the environment 100, such as those described herein. In such examples, the vehicle computing device may process data associated with the factor(s) and determine a rate of deceleration appropriate for the environment 100. For example, the vehicle computing device may determine that a drivable surface of the road is wet (e.g., rain, sprinkler overflow, etc.) and that, due to the conditions, a rate of deceleration of 15 feet per second per second may be necessary to stop the vehicle 104 (where a lesser rate may be necessary in dry road conditions).

In some examples, the rate of deceleration may be based on whether or not the vehicle is occupied. In such examples, the vehicle computing system may determine that one or more passengers are present in the vehicle 104, such as via one or more sensors in a passenger compartment, and may adjust the rate of deceleration based on the passenger(s). For example, the vehicle computing system may use an increased rate of deceleration for an empty vehicle than for an occupied vehicle, or vice versa. In some examples, the rate of deceleration maybe based on a type or class of passenger (e.g., human (e.g., adult, child, infant, etc.), animal (e.g., dog, cat, etc.), etc.). In such examples, the vehicle computing system may be configured to determine the class or type of passenger based on the sensor data received from the sensor(s) in the passenger compartment and determine the rate of deceleration based on the class or type. For example, the vehicle computing system may determine that the passenger compartment houses an adult and a dog. The vehicle computing system may determine that, to prevent the dog from becoming a projectile, the rate of deceleration may be less than a rate of deceleration associated with a vehicle 104 in a similar scenario without a canine passenger.

In some examples, the vehicle computing system may be configured to slow the vehicle 104 at a maximum rate of deceleration (e.g., 20 feet per second per second, 25 feet per second per second, etc.). In some examples the maximum rate of deceleration may be based on a maximum amount of pressure capable of being applied to the brakes, a maximum down-shift, engine braking limit, or the like, such as to slow the vehicle 104 as much as possible prior to the location in order to minimize damage to the vehicle 104 and/or the object 106(1). In some examples, the maximum rate of deceleration may include a pre-determined maximum rate.

In some examples, the maximum rate of deceleration may be associated with a pre-determined maximum amount of pressure capable of being applied to the brakes, maximum down shift, maximum amount of engine braking, etc. In such examples, the maximum rate of deceleration may be based on the factor(s). For example, a maximum rate of deceleration may be less in wet and/or snowy conditions than in dry conditions. In some examples, the maximum rate of deceleration may be determined based on whether the vehicle 104 is occupied. In such examples, the vehicle computing system may determine that one or more passengers are present in the vehicle 104 and may adjust the maximum rate of deceleration based on the passenger(s). For example, a maximum rate of deceleration may be higher for an empty vehicle 104 than for an occupied vehicle 104. In some examples, the maximum rate of deceleration may be determined based on the type or class of passenger occupying the vehicle. In such examples, the vehicle computing system may be configured to maximize the safety for occupants of the vehicle 104, such as by reducing a maximum rate of deceleration for vulnerable passengers (e.g., young, frail, etc.).

In various examples, based on a determination that the vehicle 104 is unable to stop prior to the location associated with the object, the vehicle computing system may cause the vehicle to perform the third action 210(3), such as that described above. For example, the vehicle computing system may determine that at a maximum rate of deceleration, the vehicle will be unable to stop in the distance (D). As described above, the vehicle computing system may determine that a threshold area 212 is unoccupied and may determine a lateral acceleration necessary to avoid the object 106(1) (e.g., swerve out of the way). In such examples, the lateral acceleration may be based on the distance (D) and the factor(s) associated with the environment 100, such as vehicle 104 speed, road conditions, weather, and the like.

The vehicle computing system may select the action 210 based on safety considerations for the occupants of the vehicle and/or others present in the environment (e.g., passengers of other vehicles, etc.). As such, the techniques described herein may greatly improve the safety of autonomous vehicle operations.

Figure 3:
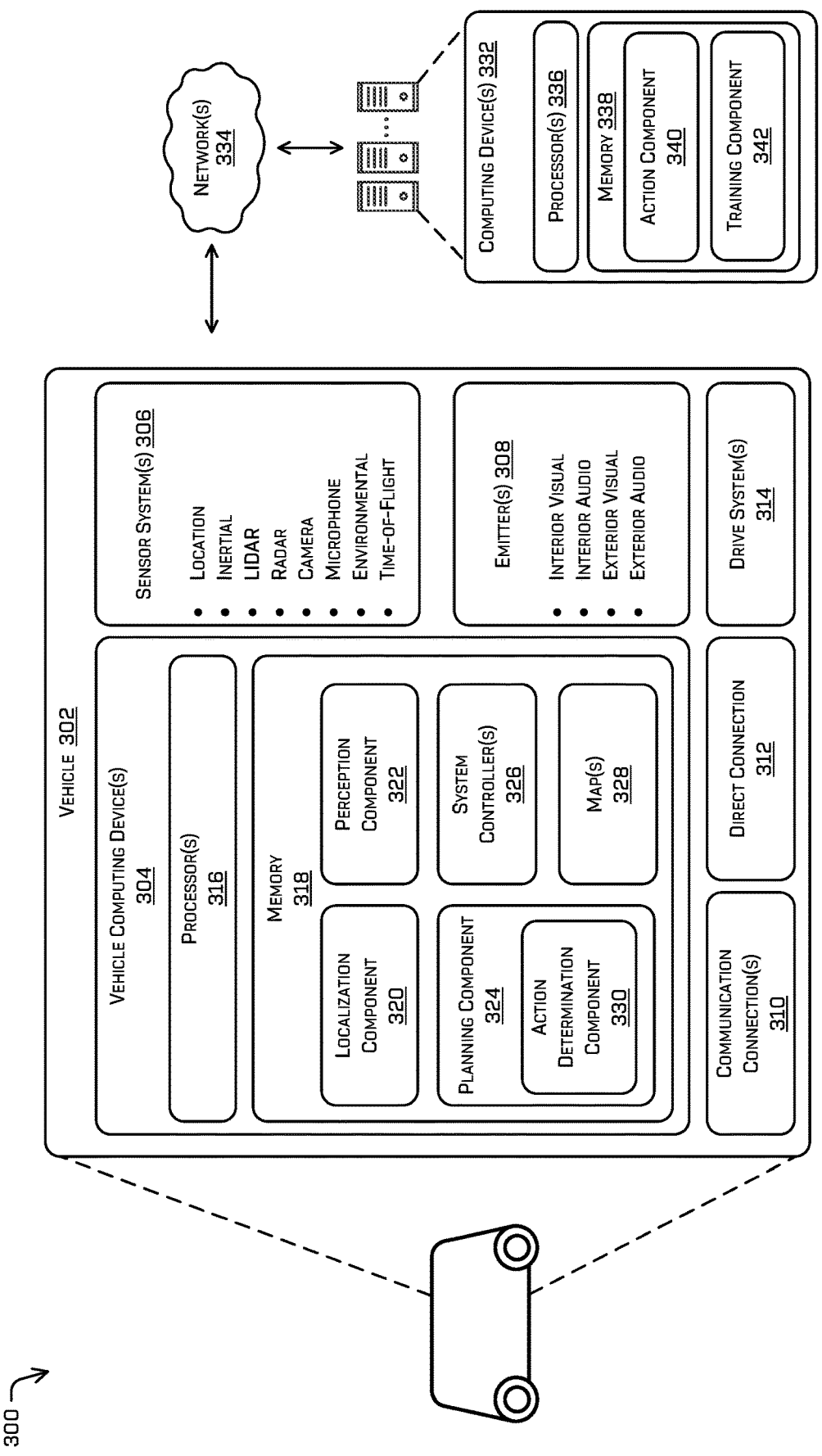
FIG. 3 depicts a block diagram of an example system for implementing the techniques described herein.

FIG. 3 depicts a block diagram of an example system 300 for implementing the techniques described herein. In at least one example, the system 300 can include a vehicle 302, such as vehicle 104. The vehicle 302 may include an autonomous, semi-autonomous, or manually controlled vehicle.

The vehicle 302 may include vehicle computing device(s) 304, one or more sensor systems 306, such as sensors 110 of FIG. 1, one or more emitters 308, one or more communication connections 310, at least one direct connection 312, and one or more drive systems 314. The vehicle computing device(s) 304 may include one or more processors 316 and memory 318 communicatively coupled with the one or more processors 316. In the illustrative example, the vehicle 302 is an autonomous vehicle; however, the vehicle 302 could be any other type of vehicle or robotic platform having at least an image capture device (e.g., camera enabled smartphone). In the illustrated example, the memory 318 of the vehicle computing device(s) 304 stores a localization component 320, a perception component 322, a planning component 324, one or more system controllers 326, and one or more maps 328. Though depicted in FIG. 3 as residing in the memory 318 for illustrative purposes, it is contemplated that the localization component 320, the perception component 322, the planning component 324, the one or more system controllers 326, and the one or more maps 328 may additionally, or alternatively, be accessible to the vehicle 302 (e.g., stored on, or otherwise accessible by, memory remote from the vehicle 302).

In at least one example, the localization component 320 may include functionality to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory, for determining to retrieve map data, and so forth, as discussed herein.

In some instances, the perception component 322 can include functionality to perform object detection, segmentation, and/or classification. In some examples, the perception component 322 can provide processed sensor data that indicates a presence of an entity or object that is proximate to the vehicle 302 and/or a classification of the entity as an entity type (e.g., car, wheel, pedestrian, cyclist, animal, building, tree, road surface, curb, sidewalk, stoplight, stop sign, lane marker, vehicle light, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 322 performs detection, the perception component 322 may output detections of objects and/or features of objects detected in the image. Such detections may comprise two-dimensional bounding boxes (which may subsequently be used to crop the image) and/or masks of the detected object. In some examples, such detection may utilize a machine learning approach (e.g., scale-invariant feature transform (SIFT), histogram of oriented gradients (HOG), etc.) followed by a support vector machine (SVM) to classify objects depicted in images received from a camera and/or lidar data received from a lidar sensor of the sensor system(s) 306. Alternatively or additionally, detection may utilize a deep learning approach based on a convolutional neural network (CNN) to classify objects depicted in sensor data captured by the sensor system(s) 306. In various examples, the perception component 322 may utilize the machine learning approach to determine a probability that a detected entity is associated with a region of particulate matter. In such examples, the perception component may provide the probability to an action determination component 330 of the planning component 324 to determine an action to perform, utilizing the techniques described herein.

In general, the planning component 324 may determine a path for the vehicle 302 to follow to traverse through an environment. For example, the planning component 324 may determine various routes and vehicle trajectories and various levels of detail. For example, the planning component 324 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In various examples, the action determination component 330 of the planning component 324 may receive data associated with a detected entity, such as a probability that the entity comprises a region of particulate matter. In such examples, the action determination component 330 may be configured to determine an action for the vehicle 302 to take based on the probability, as described herein. The action may include maintaining a trajectory or modifying a speed and/or direction of travel associated with the trajectory. In some examples, the modification may include causing the vehicle 302 to slow to a stop prior to a location associated with the detected entity. For example, based on a low probability that the entity comprises particulate matter, the action determination component 330 may determine to cause the vehicle 302 to stop prior to contact with the entity. For another example, based on a high probability that the entity comprises particulate matter, the action determination component 330 may determine that the vehicle action should include maintaining a trajectory associated therewith.

Additionally, and as discussed above, the action may include slowing the vehicle 302 to capture additional data associated with the entity and determine an updated probability. In such examples, the action determination component 330 may determine that the entity is at or greater than a threshold distance away from the vehicle 302. The action determination component 330 may cause the vehicle 302 to slow a forward speed (to a pre-determined speed or dynamically determined speed). The perception component 322 may gather additional data associated with the entity and may determine an updated probability. The action determination component 330, responsive to receiving the updated probability from the perception component 322 may determine a second action to take, such as causing the vehicle to stop, change lanes, or accelerate to a speed associated with vehicle 302 travel through the environment.

In various examples, the action determination component 330 may be configured to determine a rate of acceleration. The acceleration may include a positive acceleration, such as associated with a determination to accelerate to the speed associated with the vehicle 302 travel through the environment, or a negative acceleration, such as associated with a determination to slow and/or stop the vehicle. In some examples, the acceleration may include a pre-determined acceleration associated with the vehicle 302, the environment, such as based on one or more factors associated with the environment, or the like. For example, the pre-determined acceleration for a school zone may be set at 3 feet per second per second, and in an area not associated with a school may be set at 5 feet per second per second.

In various examples, the action determination component 330 may be configured to dynamically determine the acceleration based on one or more factors associated with the environment. As discussed above, the factor(s) may include a vehicle 302 speed, speed limit associated with the environment, a number of detected objects, types of objects detected in the environment, weather (e.g., rain, snow, fog, etc.), an area or zone associated with the environment (e.g., school zone, residential area, construction zone, etc.), or the like. In various examples, the determined acceleration may include a maximum acceleration (positive or negative). In at least one examples, the maximum acceleration may include a maximum rate of deceleration. In such an example, the action determination component 330 may determine to utilize the maximum rate of deceleration in order to stop the vehicle in a short distance and/or slow the vehicle as much as possible prior to reaching a location associated with the entity.

In various examples, the action determination component 330 may determine that the vehicle 302 is unable to stop in a distance between the vehicle 302 and the entity. In such an example, the action determination component 330 may determine whether an area adjacent to the vehicle 302 is clear, such as an adjacent lane, a shoulder of a road, or the like. Based on a determination that the adjacent area is clear, the action determination component 330 may cause the vehicle to modify a trajectory to move into and/or toward the adjacent area. In various examples, the action determination component 330 may determine a lateral acceleration associated with the lateral move (trajectory modification). In some examples, the lateral acceleration may include a pre-determined lateral acceleration, such as that associated with 3 changing lanes or avoiding an object. In some examples, the action determination component 330 may dynamically determine the lateral acceleration. In some examples, the dynamically determined lateral acceleration may be based on one or more features associated with the environment. In some examples, the dynamically determined lateral acceleration may be based on a distance between the vehicle 302 and the entity. In at least one example, the lateral acceleration may be based on the distance and vehicle 302 speed. For example, a vehicle that is traveling 30 miles per hour in close proximity to the entity may be required to aggressively swerve into an adjacent lane to avoid the entity, such as based on a low probability that the entity is associated with a region of particulate matter. Though specific features of the action determination component 330 are discussed with respect to FIG. 3, it is understood that the action determination component 330 may be configured to perform the any of the functions associated with determining an action based on a probability that an object or entity is associated with a region of particulate matter, as described herein.

The memory 318 may further include one or more maps 328 that may be used by the vehicle 302 to navigate within the environment, and/or to determine locations of features in the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 328 can include at least one map (e.g., images and/or a mesh). In some examples, the vehicle 302 can be controlled based at least in part on the map(s) 328. That is, the map(s) 328 can be used in connection with the localization component 320, the perception component 322, the planning component 324, and/or the action determination component 330 to determine a location of the vehicle 302, identify objects and/or environmental features in an environment, and/or generate routes and/or trajectories to navigate within an environment.

In some examples, the one or more maps 328 can be stored on a remote computing device(s) (such as the computing device(s) 332) accessible via network(s) 334. In some examples, multiple maps 328 can be stored based on, for example, a characteristic (e.g., type of entity, time of day, day of week, season of the year, etc.). Storing multiple maps 328 can have similar memory requirements, but increase the speed at which data in a map can be accessed. In some examples, the one or more maps 328 can store sizes or dimensions of objects associated with individual locations in an environment. For example, as the vehicle 302 traverses the environment and as maps representing an area proximate to the vehicle 302 are loaded into memory, one or more sizes or dimensions of objects associated with a location can be loaded into memory as well.

In at least one example, the vehicle computing device(s) 304 can include one or more system controllers 326, which can be configured to control steering, propulsion, braking, safety, emitters, communication, and other systems of the vehicle 302. The system controller(s) 326 can communicate with and/or control corresponding systems of the drive system(s) 314 and/or other components of the vehicle 302.

As can be understood, the components discussed herein (e.g., the localization component 320, the perception component 322, the planning component 324 including the action determination component 330, the one or more system controllers 326, and the one or more maps 328) are described as divided for illustrative purposes. However, the operations performed by the various components can be combined or performed in any other component.

In at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the lidar sensors can include individual lidar sensors located at the corners, front, back, sides, and/or top of the vehicle 302. As another example, the camera sensors can include multiple cameras disposed at various locations about the exterior and/or interior of the vehicle 302. In some examples, the camera sensors located in the interior of the vehicle may provide sensor data to the perception component 322 for determination of whether a passenger is occupying the passenger compartment and/or a type or class associated with the passenger. In such examples, the action determination component 330 may utilize the passenger information in determining an action to take and/or determining an acceleration (e.g., positive, negative, lateral) associated with an action. The sensor system(s) 306 can provide input to the vehicle computing device(s) 304. Additionally or alternatively, the sensor system(s) 306 can send sensor data, via the one or more networks 334, to the one or more computing device(s) 332 at a particular frequency, after a lapse of a predetermined period of time, in near real-time, etc.

The vehicle 302 can also include one or more emitter(s) 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communication connection(s) 310 may also enable the vehicle 302 to communicate with a remote teleoperations computing device or other remote services.

The communication connection(s) 310 can include physical and/or logical interfaces for connecting the vehicle computing device(s) 304 to another computing device or a network, such as network(s) 334. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 314. Furthermore, the drive system(s) 314 may also include one or more communication connection(s) that enable communication by the respective drive system with one or more other local or remote computing device(s).

In at least one example, the direct connection 312 can provide a physical interface to couple the one or more drive system(s) 314 with the body of the vehicle 302. For example, the direct connection 312 can allow the transfer of energy, fluids, air, data, etc. between the drive system(s) 314 and the vehicle. In some instances, the direct connection 312 can further releasably secure the drive system(s) 314 to the body of the vehicle 302.

In at least one example, the localization component 320, the perception component 322, the planning component 324, the one or more system controllers 326, and one or more maps 328 may process sensor data, as described above, and may send their respective outputs, over the one or more networks 334, to one or more computing devices 332. In at least one example, the localization component 320, the perception component 322, the planning component 324, the one or more system controllers 326, and one or more maps 328 may send their respective outputs to the computing device(s) 332 at a particular frequency, after a lapse of a predetermined period of time, in near real-time, etc.

In some examples, the vehicle 302 may send sensor data to one or more computing devices 332 via the network(s) 334. In some examples, the vehicle 302 can send raw sensor data to the computing device(s) 332. In other examples, the vehicle 302 may send processed sensor data and/or representations of sensor data to the computing device(s) 332. In some examples, the vehicle 302 may send sensor data to the computing device(s) 332 at a particular frequency, after a lapse of a predetermined period of time, in near real-time, etc. In some cases, the vehicle 302 may send sensor data (raw or processed) to the computing device(s) 332 as one or more log files.

The computing device(s) 332 may include processor(s) 336 and a memory 338 storing an action component 340 and a training component 342. The action component 340 may be configured to perform functionality similar to the action determination component 330, as described above. In some examples, the action component 340 may store one or more pre-determined accelerations (e.g., positive, negative, lateral) for use by the action determination component 330. In such examples, the computing device(s) 332 may send the pre-determined acceleration(s) from the action component 340 to the action determination component 330.

In some instances, the training component 342 may include functionality to train one or more models to detect objects and/or features of objects, determine (classify or regress) objects and/or features of objects, determine positions of objects in the environment, and the like. As noted herein, sensor data can be annotated or indicated as representing regions of particulate matter, and such annotated or indicated data can be identified as training data. The training data can be input to a machine learning model where a known result (e.g., a ground truth, such as the known "future" attributes) can be used to adjust weights and/or parameters of the machine learning model to minimize an error.

In some instances, the training component 342 can communicate information generated by the one or more models to the vehicle computing device(s) 304 to revise how to control the vehicle 302 in response to different situations.

For instance, aspects of some or all of the components discussed herein can include any models, algorithms, and/or machine learning algorithms. For example, in some instances, the components in the memory 338 (and the memory 318, discussed above) can be implemented as a neural network. In some examples, the training component 342 can utilize a neural network to generate and/or execute one or more models to improve various aspects of object trajectory estimation for use in trajectory planning of the vehicle 302.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatter-plot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 316 of the vehicle 302 and the processor(s) 336 of the computing device(s) 332 can be any suitable processor capable of executing instructions to process data and perform operations as described herein. By way of example and not limitation, the processor(s) 316 and 336 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. The memory 318 and 338 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 332 and/or components of the computing device(s) 332 may be associated with the vehicle 302. That is, the vehicle 302 can perform one or more of the functions associated with the computing device(s) 332, and vice versa.

Figure 4:
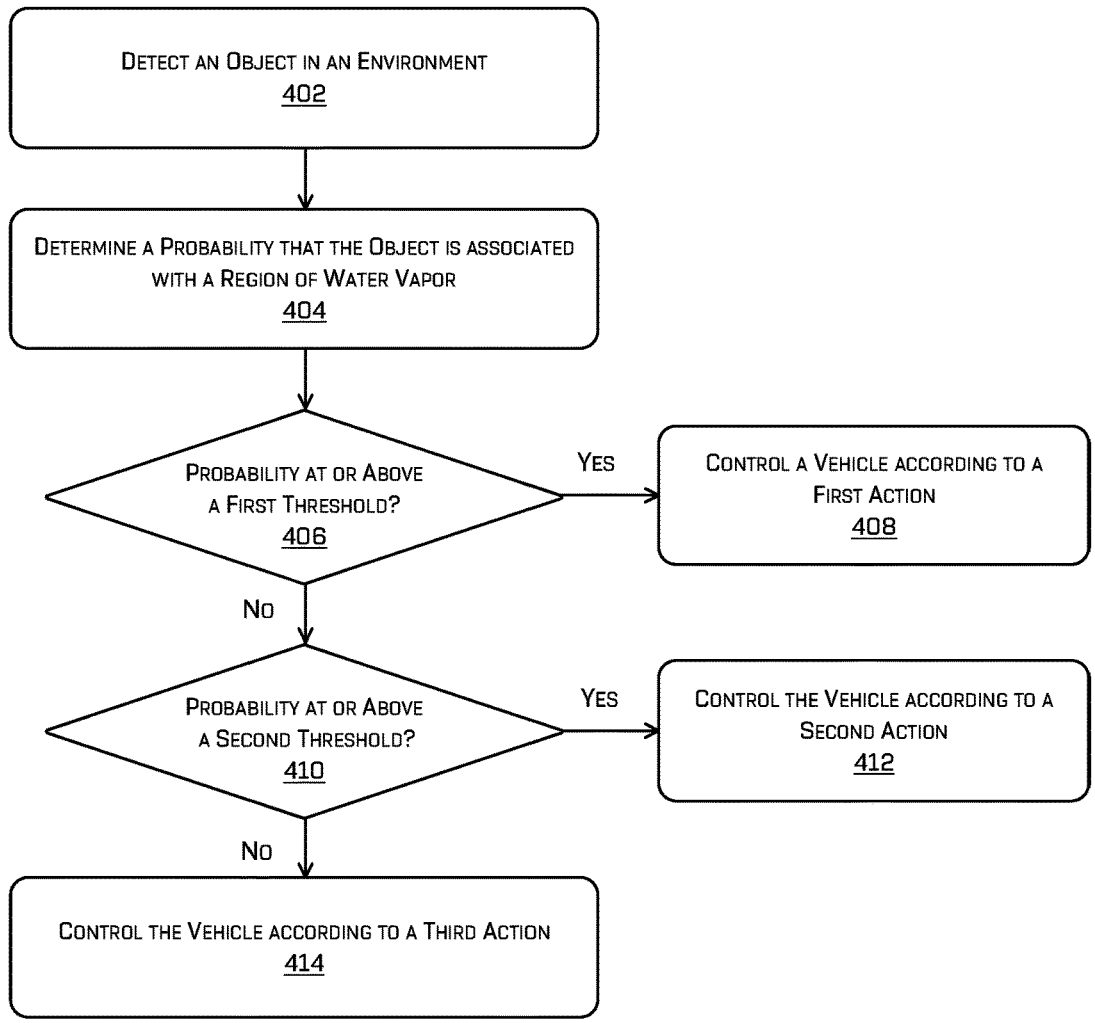
FIG. 4 depicts an example process for controlling a vehicle based on a probability that a detected object is associated with a region of particulate matter.
Figure 5:
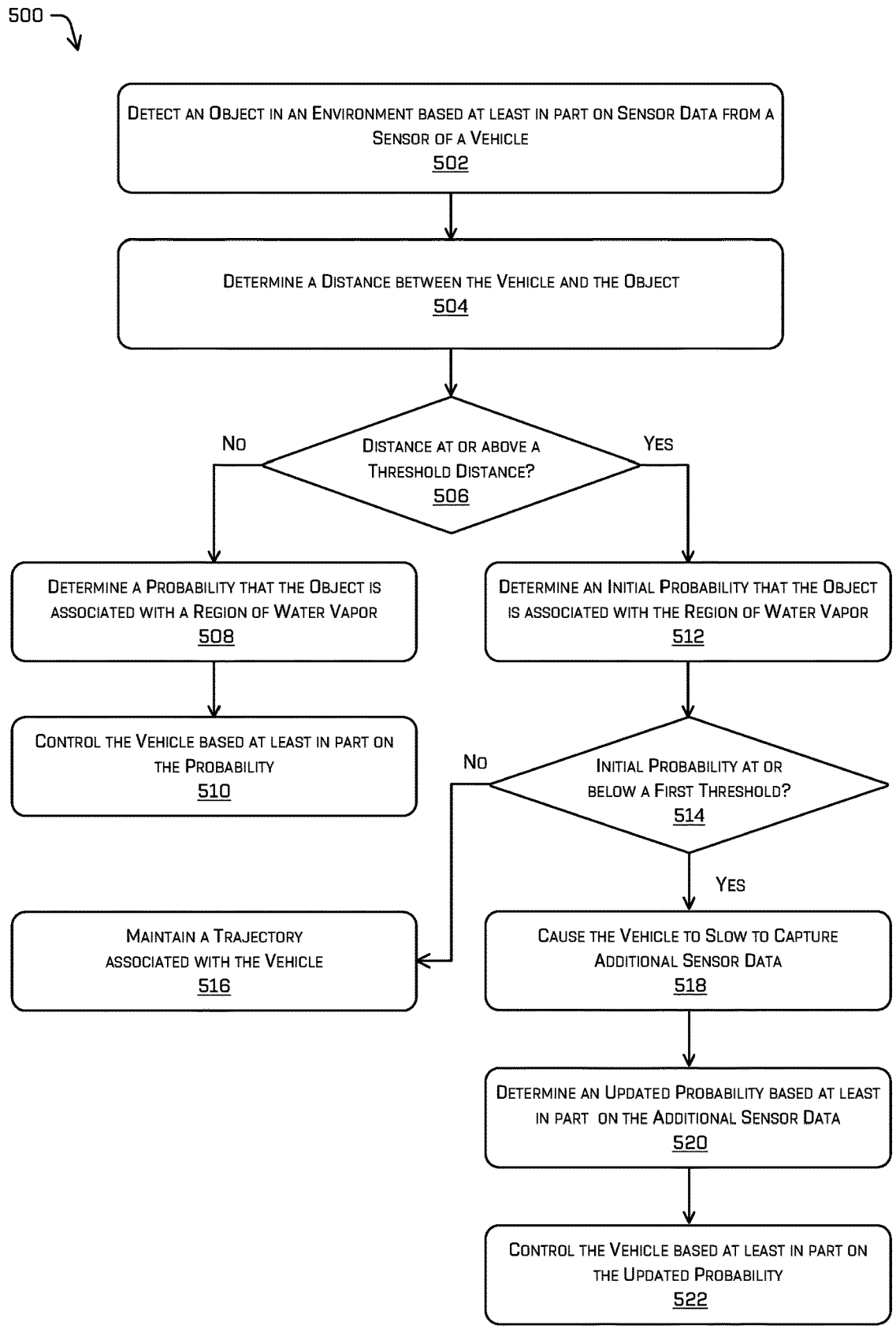
FIG. 5 depicts an example process for slowing a vehicle in order to gather additional data regarding an object to determine whether the object is associated with a region of particulate matter.
Figure 6:
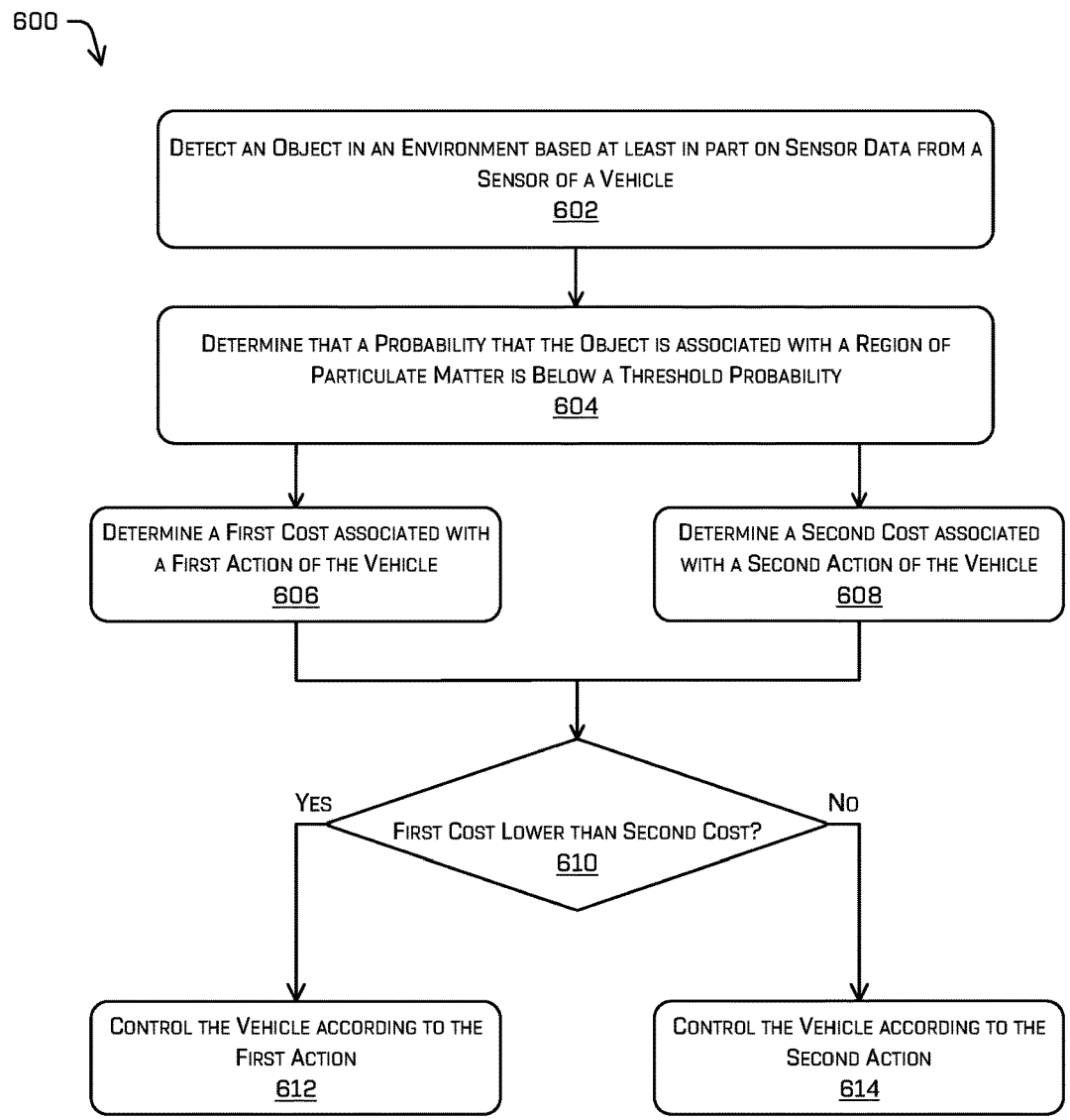
FIG. 6 depicts an example process for controlling a vehicle to avoid an object that is likely not associated (e.g., low probability) with a region of particulate matter.

FIGS. 4-6 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 4 depicts an example process 400 for controlling a vehicle based on a probability that a detected object is associated with a region of particulate matter. For example, some or all of the process 400 can be performed by one or more components in FIG. 3, as described herein. For example, some or all of the process 400 can be performed by the vehicle computing device(s) 304, the computing device(s) 332, or any other computing device or combination of computing devices. Further, any of the operations described in the example process 400 may be executed in parallel, in a different order than depicted in the process 400, omitted, combined with other processes, and the like.

At operation 402, the process may include detecting an object in an environment. In some examples, a vehicle computing system may receive sensor data from one or more sensors of a vehicle. As described above, the sensor data may include data captured by one or more lidar sensors, radar sensors, cameras, time of flight sensors, or the like. In at least one examples, the sensor data may include lidar data. The vehicle computing system may be configured to receive the sensor data and detect the object based on the sensor data. The vehicle computing system may additionally be configured to classify the object (e.g., determine a type or classification of the object) based on the sensor data.

At operation 404, the process may include determining a probability that the object is associated with a region of particulate matter. In various examples, the vehicle computing system may determine a classification of the object as a region of particulate matter and a confidence associated with the classification. In such examples, the confidence may correspond to the probability that the object is associated with a region of particulate matter. In some examples, the vehicle computing system may be unable to determine a classification associated with the detected object. In such examples, the vehicle computing system may determine a probability that the object is associated with the region of particulate matter. For example, the vehicle computing system may receive lidar data in which an object was detected (e.g., light reflected off a surface or molecule). The vehicle computing system may process the data and may be unable to classify the object as a particular classification of object. The vehicle computing system may thus process the sensor data to determine a probability that the object is associated with a region of particulate matter.

In various examples, the probability may be determined based on one or more features associated with the object, such as those described above. In some examples, the probability may be determined based on map data associated with the environment. In some examples, the probability may be determined utilizing machine learning models, such as those trained to determine a classification of an object and a confidence associated with the classification.

At operation 406, the process may include determining whether the probability is at or above a first threshold (e.g., 85%, 90%, 95%, etc.). In some examples, the first threshold may include an upper threshold, above which the probability that the object is associated with a region of particulate matter is high. As discussed above, though described in terms of thresholds herein, this is not meant to be so limiting. For instance, while some examples may set fixed thresholds for decision-making, it should be understood that any discussion of thresholds herein may also refer to cost expressions set up in such a way such that a transition occurs between two outcomes based on an optimization over the cost at or about such a threshold. In various examples, combinations of hard constraints (e.g., fixed threshold for decisions), as well as thresholds as representing transitions in a cost-optimization are contemplated.

Based on a determination that the probability is at or above the first threshold ("Yes" at operation 406), the process may include, at operation 408, controlling the vehicle according to a first action. In some examples, the first action may include causing the vehicle to maintain a trajectory associated with travel through the environment. In such examples, based on a determination that the probability is high that the object is associated with a region of particulate matter, the vehicle may proceed past (or through) the object while traveling through the environment. In some examples, the first action may include slowing a speed associated with the vehicle. In such examples, the vehicle computing system may cause the vehicle to slow to a pre-determined or dynamically determined speed for passing and/or traveling through the region of particulate matter. In such examples, the vehicle computing system may be configured to safely react to and/or navigate around another object located behind the object associated with the particulate matter. In some examples, the first action may additionally or alternatively include modifying a position in a lane or performing a lane change to avoid the object. In such examples, regardless of the high probability that the object is associated with a region of particulate matter, the vehicle computing system may cause the vehicle to navigate around the object, such as to maximize operational safety.

Based on a determination that the probability is not at or above the first threshold ("No" at operation 406), the process may include, at operation 410, determining whether the probability is at or above a second threshold (e.g., 55%, 60%, 70%, etc.). In some examples, the second threshold may be associated with a medium probability that the object is associated with the region of particulate matter.

Based on a determination that the probability is at or above the second threshold ("Yes" at operation 410), the process may include, at operation 412, controlling the vehicle according to a second action. The second action may include modifying a trajectory associated with the vehicle. As discussed above, the second action may include modifying the trajectory to slow a speed of the vehicle. The modified speed may include a pre-determined speed or a speed that is dynamically determined by the vehicle computing system, such as based on one or more factors associated with the environment. In various examples, based on a distance between the vehicle and the object, the modified speed may provide an opportunity for the vehicle computing system to capture additional data and determine an updated probability associated with the object. Based on the updated data, the vehicle may determine an action (e.g., the first action, second action, or the third action) to perform.

In various examples, the second action may include modifying the trajectory to move the vehicle laterally. In such examples, the vehicle computing system may determine a lateral acceleration associated with the second action, such as that described above.

Based on a determination that the probability is not at or above the second threshold ("No" at operation 410), the process may include, at operation 414, controlling the vehicle according to a third action. In some examples, the third action may include modifying a trajectory of the vehicle to cause the vehicle to stop. In some examples, the vehicle computing system may determine a rate of deceleration associated with the third action. In such examples, the rate of deceleration may include a pre-determined rate or a dynamically determined rate, such as described above. In some examples, the rate of deceleration may be based on a determination that the vehicle is occupied and/or a type or classification of a passenger occupying the vehicle.

In some examples, such as based on a determination that the vehicle will be unable to stop prior to a location associated with the object, the third action may include modifying the trajectory of the vehicle to move laterally, such as into an adjacent lane, a shoulder, or the like. As discussed above, the vehicle computing system may determine that the area into which the vehicle would move laterally is clear of objects. In various examples, the vehicle computing system may determine a lateral acceleration associated with the third action. The lateral acceleration may be based on factors associated with the environment, a distance between the vehicle and the object, or the like.

FIG. 5 depicts an example process 500 for slowing a vehicle in order to gather additional data regarding an object to determine whether the object is associated with a region of particulate matter. For example, some or all of the process 500 can be performed by one or more components in FIG. 3, as described herein. For example, some or all of the process 500 can be performed by the vehicle computing device(s) 304, the computing device(s) 332, or any other computing device or combination of computing devices. Further, any of the operations described in the example process 500 may be executed in parallel, in a different order than depicted in the process 500, omitted, combined with other processes, and the like.

At operation 502, the process may include detecting an object in an environment based at least in part on sensor data from a sensor of a vehicle. As described above, the sensor data may include data captured by one or more lidar sensors, radar sensors, cameras, time of flight sensors, or the like. In at least one examples, the sensor data may include lidar data. The vehicle computing system may be configured to receive the sensor data and detect the object based on the sensor data. The vehicle computing system may additionally be configured to classify the object (e.g., determine a type or classification of the object) based on the sensor data.

At operation 504, the process may include determining a distance between the vehicle and the object. In some examples, the distance may include a distance between a location associated with the vehicle and a location associated with the object.

At operation 506, the process may include determining whether the distance is at or above a threshold distance (e.g., 100 feet, 100 meters, etc.). The threshold distance may represent a distance that is sufficient to allow the vehicle to gather additional data with respect to the object in order to ensure an accurate probability that the object is associated with a region of particulate matter.

Based on a determination that the distance is not at or above the threshold distance ("No" at operation 506), the process may include, at operation 508, determining a probability that the object is associated with a region of particulate matter. In various examples, the vehicle computing system may determine a classification of the object as a region of particulate matter and a confidence associated with the classification. In such examples, the confidence may correspond to the probability that the object is associated with a region of particulate matter. In some examples, the vehicle computing system may be unable to determine a classification associated with the detected object. In such examples, the vehicle computing system may determine a probability that the object is associated with the region of particulate matter. For example, the vehicle computing system may receive lidar data in which an object was detected (e.g., light reflected off a surface or molecule). The vehicle computing system may process the data and may be unable to classify the object as a particular classification of object. The vehicle computing system may thus process the sensor data to determine a probability that the object is associated with a region of particulate matter.

In various examples, the probability may be determined based on one or more features associated with the object, such as those described above. In some examples, the probability may be determined based on map data associated with the environment. In some examples, the probability may be determined utilizing machine learning models, such as those trained to determine a classification of an object and a confidence associated with the classification.

At operation 510, the process may include controlling the vehicle based at least in part on the probability. In various examples, the vehicle computing system may control the vehicle according to any of the actions described above.

Based on a determination that the distance is at or above the threshold distance ("Yes" at operation 506), the process may include, at operation 512, determining an initial probability that the object is associated with the region of particulate matter. The initial probability may be determined as described above with regard to operation 508. For example, the initial probability may be determined based on one or more features associated with the object, map data, and/or utilizing machine learning techniques.

At operation 514, the process may include determining whether the initial probability is at or below a first threshold (e.g., 95%, 98%, etc.). In various examples, the first threshold may include a probability above which the object has a high probability of being associated with a region of particulate matter.

Based on a determination that the initial probability is above the first threshold ("No" at operation 514), the process may include, at operation 516, maintaining a trajectory associated with the vehicle. The trajectory may include an initial trajectory, determined by a planning component of the vehicle computing system, for the vehicle to travel through the environment, such as along a path from a first location to a second location, to a destination, or the like.

Based on a determination that the initial probability is at or below the first threshold ("Yes" at operation 514), the process may include, at operation 518, causing the vehicle to slow to capture additional sensor data. In some examples, the vehicle computing system may modify the trajectory of the vehicle to a pre-determined speed (e.g., 10 miles per hour, 15 kilometers per hour, etc.). In some examples, the vehicle computing system may dynamically determine a speed associated with the modified trajectory. In such examples, the speed may be determined based on one or more factors in the environment, such as those described above.

At operation 520, the process may include determining an updated probability based at least in part on the additional sensor data. In various examples, the vehicle computing system may process the additional sensor data to determine the updated probability utilizing the techniques described above with regard to operations 508 and/or operation 512.

At operation 522, the process may include controlling the vehicle based at least in part on the updated probability. In various examples, based on a determination that the updated probability is at or above the first threshold probability, the vehicle computing system may cause the vehicle to accelerate to an updated trajectory for progressing toward a destination. The updated trajectory may include an initial speed such as that associated with the initial trajectory or a different speed. In various examples, based on a determination that the updated probability is at or below the first threshold probability and/or at or above a second threshold probability, the vehicle computing system may determine to maintain the slow speed associated with the modified trajectory, such as that discussed above with regard to operation 516.

In various examples, based on a determination that the updated probability is at or below the first threshold probability and/or at or above the second threshold probability, the vehicle computing system may determine to modify the vehicle trajectory to move the vehicle into an adjacent area, such as an adjacent lane, shoulder, etc. In such examples, and as discussed above, the vehicle computing system may determine that the adjacent area is clear of other objects prior to causing the vehicle to move laterally. In some examples, the vehicle computing system may determine the lateral acceleration associated with the lateral move.

In various examples, based on a determination that the probability is at or below the second threshold, the vehicle computing system may slow the vehicle to a stop. In some examples, the vehicle computing system may determine a rate of deceleration and/or brake pressure, engine braking, downshifting, or the like associated with stopping the vehicle prior to a location associated with the object. As discussed above, the rate of deceleration may be pre-determined or dynamically determined by the vehicle computing system, such as based on one or more factors associated with the environment and/or a distance between the object and the vehicle.

In various examples, based on a determination that the vehicle will be unable to stop prior to the location associated with the object, the vehicle computing system may cause the vehicle to additionally or alternatively adjust a position laterally to avoid the object. In such examples, the vehicle computing system may determine a lateral acceleration necessary to avoid the object. The lateral acceleration may be based on a distance between the vehicle and the object and/or factors associated with the environment, such as vehicle speed. The vehicle computing system may be configured to modify the trajectory (or trajectories) associated with the vehicle to maximize safety of the vehicle and objects operating in the environment.

FIG. 6 depicts an example process 600 for controlling the vehicle to avoid an object that is likely not associated (e.g., low probability) with a region of particulate matter. For example, some or all of the process 600 can be performed by one or more components in FIG. 3, as described herein. For example, some or all of the process 600 can be performed by the vehicle computing device(s) 304, the computing device(s) 332, or any other computing device or combination of computing devices. Further, any of the operations described in the example process 600 may be executed in parallel, in a different order than depicted in the process 600, omitted, combined with other processes, and the like.

At operation 602, the process may include detecting an object in an environment based at least in part on sensor data from a sensor of a vehicle. As described above, the sensor data may include data captured by one or more lidar sensors, radar sensors, cameras, time of flight sensors, or the like. In at least one examples, the sensor data may include lidar data. The vehicle computing system may be configured to receive the sensor data and detect the object based on the sensor data. The vehicle computing system may additionally be configured to classify the object (e.g., determine a type or classification of the object) based on the sensor data.

At operation 604, the process may include determining that a probability that the object is associated with a region of particulate matter is below a threshold probability. As described above, the probability may be determined based on one or more features associated with the object, such as those described above. In some examples, the probability may be determined based on map data associated with the environment. In some examples, the probability may be determined utilizing machine learning models, such as those trained to determine a classification of an object and a confidence associated with the classification. In various examples, the threshold probability (e.g., 50%, 40%, etc.) may be associated with a low probability that the object is associated with a region of particulate matter.

At operation 606, the process may include determining a first cost associated with a first action of the vehicle. As discussed above, the first cost may include one or more of a safety cost, a progress cost, a comfort cost, and an operational rules cost associated with the first action. In various examples, the first action may include causing the vehicle to slow and/or stop prior to a location associated with the object. In some examples, the first cost may be based at least in part on a rate of deceleration (negative acceleration) associated with the vehicle stopping and/or slowing. In various examples, the rate of deceleration may include a pre-determined rate. In some examples, the pre-determined rate may be based on a speed associated with the vehicle. In such examples, the vehicle computing system may determine a speed associated with an initial trajectory and may determine the rate of deceleration based on the speed. For example, the vehicle computing system may have stored therein a table of pre-determined rates of deceleration associated with different vehicle speeds. In some examples, the rate of deceleration may include a maximum rate of deceleration. In some examples, the maximum rate of deceleration may include a maximum amount of pressure capable of being applied to the brakes, maximum down-shift, engine braking limitation, or the like.

At operation 608, the process may include determining a second cost associated with a second action of the vehicle. As discussed above, the second cost may include one or more of a safety cost, a progress cost, a comfort cost, and an operational rules cost associated with the second action. In various examples, the second action may include causing the vehicle to adjust a position laterally to navigate around the object, such as adjusting a position in a lane, partially changing lanes, and/or fully changing lanes to navigate around the object. In various examples, the second cost may be associated with a lateral acceleration and/or horizontal acceleration associated with the second action.

In various examples, the second cost may be based on a determination of whether a lateral area is clear of objects. In such examples, the vehicle computing system may process sensor data received from the one or more sensors of the vehicle to determine whether the lateral area is clear. In some examples, the lateral area may include an area adjacent to the vehicle into which the vehicle may legally enter. For example, the lateral area may include an adjacent lane, a shoulder, or the like.

At operation 610, the process may include determining whether the first cost is lower than the second cost.

Based on a determination that the first cost is lower than the second cost ("Yes" at operation 610), the process may include, at operation 612, controlling the vehicle according to the first action Based on a determination that the first cost is higher than the second cost ("No" at operation 610), the process may include, at operation 614, controlling the vehicle according to the second action.

Example Clauses

A: A system comprising: one or more processors; and one or more computer-readable media storing instructions executable by the one or more processors, wherein the instructions, when executed, cause the system to perform operations comprising: capturing sensor data of an environment using a sensor on an autonomous vehicle; determining that the sensor data represents an object in the environment; determining a probability that the object comprises a region of particulate matter; and performing at least one of: based on a first determination that the probability is equal to or greater than a threshold probability, controlling the autonomous vehicle according to a first trajectory; or based on a second determination that the probability is less than the threshold probability, controlling the autonomous vehicle according to a second trajectory.

B: The system as paragraph A describes, wherein: the first trajectory comprises maintaining a velocity of the autonomous vehicle; and the second trajectory comprises at least one of: slowing a velocity of the autonomous vehicle; stopping the autonomous vehicle prior to a location associated with the object; or adjusting a lateral position of the autonomous vehicle to avoid the object.

C: The system as either of paragraphs A or B describe, wherein the autonomous vehicle is controlled according to the second trajectory, the second trajectory comprising a second speed that is less than a first speed associated with the first trajectory, the operations further comprising: capturing additional sensor data that represents the object in the environment; determining an updated probability that the object comprises the region of particulate matter based at least in part on the additional sensor data; and controlling, based at least in part on the updated probability, the autonomous vehicle according to a third trajectory, the third trajectory comprising a third speed that is greater than the second speed.

D: The system as any one of paragraphs A-C describe, the operations further comprising: determining a distance between the autonomous vehicle to a location associated with the object; and determining a rate of deceleration to stop the autonomous vehicle prior to the location associated with the object; wherein controlling the autonomous vehicle according to the second trajectory comprises controlling the autonomous vehicle in accordance with the rate of deceleration.

E: The system as any one of paragraphs A-D describe, wherein the autonomous vehicle is controlled according to the second trajectory, the operations further comprising: determining that an area adjacent the autonomous vehicle is unoccupied by other objects; and determining a lateral acceleration associated with a movement of the autonomous vehicle into the area; wherein the second trajectory comprises the lateral acceleration.

F: A computer-implemented method comprising: receiving sensor data captured by a sensor in an environment; determining that the sensor data represents an object in the environment; determining, utilizing machine learning techniques, a probability that the object comprises a region of particulate matter; and controlling a vehicle based at least in part on the probability.

G: The computer-implemented method as paragraph F describes, wherein controlling the vehicle comprises at least one of: determining that the probability is associated with a first probability that the object is associated with the region of particulate matter and stopping the vehicle prior to a location associated with the object; determining that the probability is associated with a second probability that the object is associated with the region of particulate matter and slowing a velocity of the vehicle, wherein the second probability is higher than the first probability; or determining that the probability is associated with a third probability that the object is associated with the region of particulate matter and maintaining the velocity of the vehicle, wherein the third probability is higher than the second probability.

H: The computer-implemented method as either of paragraphs F or G describe, further comprising: determining a distance between the vehicle and a location associated with the object; and determining that the distance is greater than a threshold distance, wherein controlling the vehicle comprises slowing the vehicle to capture additional sensor data associated with the object.

I: The computer-implemented method as any one of paragraphs F-H describe, further comprising: determining an updated probability based at least in part on the additional sensor data; and increasing a speed of the vehicle based at least in part on the updated probability.

J: The computer-implemented method as any one of paragraphs F-I describe, further comprising: determining that the probability is less than a threshold probability; determining a distance between the vehicle and a location associated with the object; and determining a rate of deceleration based at least in part on the distance, wherein controlling the vehicle comprises slowing the vehicle at the rate of deceleration.

K: The computer-implemented method as any one of paragraphs F-J describe, further comprising: determining that the probability is less than a threshold probability; determining that the vehicle is occupied by a passenger; and determining a rate of deceleration based at least in part on the passenger, wherein controlling the vehicle comprises slowing the vehicle at the rate of deceleration.

L: The computer-implemented method as any one of paragraphs F-K describe, wherein controlling the vehicle comprises: determining a first action for the vehicle to take based at least in part on the probability; determining a second action for the vehicle to take based at least in part on the probability; determining a first cost associated with the first action and a second cost associated with the second action; determining that the first cost associated with the first action is less than the second cost associated with the second action; and causing the vehicle to perform the first action based at least in part on the first cost being less than the second cost.

M: The computer-implemented method as any one of paragraphs F-L describe, wherein at least one of the first action or the second action comprises at least one of: maintaining a trajectory of the vehicle; reducing a speed of the vehicle to a pre-determined speed; reducing the speed of the vehicle to a dynamically determined speed; stopping the vehicle prior to a location associated with the object; or adjusting a lateral position of the vehicle to avoid the object.

N: The computer-implemented method as any one of paragraphs F-M describe, further comprising: determining that the probability is less than a threshold probability; determining a first distance between the vehicle and a location associated with the object; determining a second distance for the vehicle to stop at a rate of deceleration; and determining that the second distance exceeds the first distance, wherein controlling the vehicle comprises adjusting a lateral position of the vehicle to avoid the object.

O: A system or device comprising: a processor; and a non-transitory computer-readable medium storing instructions that, when executed, cause processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: One or more computer-readable media storing instructions that when executed by one or more processors perform operations comprising: receiving sensor data captured by a sensor in an environment; determining that the sensor data represents an object in the environment; determining a probability that the object comprises a region of particulate matter, wherein the probability is determined based at least in part on at least one of a size, shape, track or location associated with the object; and controlling a vehicle based at least in part on the probability.

R: The one or more computer-readable media as paragraph Q describes, wherein controlling the vehicle comprises maintaining a trajectory associated with the vehicle.

S: The one or more computer-readable media as either one of paragraphs Q or R describe, wherein controlling the vehicle comprises modifying a trajectory associated with the vehicle, modifying the trajectory comprising at least one of: reducing a speed of the vehicle to a pre-determined speed; stopping the vehicle; or adjusting a lateral position of the vehicle to avoid the object.

T: The one or more computer-readable media as any one of paragraphs Q-S describe, the operations further comprising: determining that a distance between the vehicle and the location associated with the object is above a threshold distance, wherein controlling the vehicle comprises causing the vehicle to travel at a first speed; capturing additional sensor data that represents the object in the environment; determining an updated probability that the object comprises the region of particulate matter based at least in part on the additional sensor data; and causing, based at least in part on the updated probability, the vehicle to accelerate to a second speed, the second speed being greater than the first speed.

U: The one or more computer-readable media as any one of paragraphs Q-T describe, the operations further comprising: determining a first action for the vehicle to take based at least in part on the probability; determining a second action for the vehicle to take based at least in part on the probability; determining a first cost associated with the first action and a second cost associated with the second action; determining that the first cost associated with the first action is less than the second cost associated with the second action; and causing the vehicle to perform the first action based at least in part on the first cost being less than the second cost.

V: The one or more computer-readable media as any one of paragraphs Q-U describe, wherein at least one of the first action or the second action comprises at least one of: maintaining a trajectory of the vehicle; reducing a speed of the vehicle to a pre-determined speed; reducing the speed of the vehicle to a dynamically determined speed; stopping the vehicle prior to a location associated with the object; or adjusting a lateral position of the vehicle to avoid the object.

While the example clauses described above are described with respect to one particular implementation, it should be understood that, in the context of this document, the content of the example clauses can also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
capturing sensor data of an environment using a sensor on an autonomous vehicle;
determining that the sensor data represents an object in the environment;
determining, based at least in part on a portion of the sensor data associated with the object, a feature comprising at least one of a size or a shape of the object;
determining, based at least in part on the feature, a probability that the object comprises a region of particulate matter;
based on a first determination that the probability is equal to or greater than a first threshold probability, controlling the autonomous vehicle according to a first trajectory;
based on a second determination that the probability is equal to or greater than a second threshold probability and less than the first threshold probability, controlling a velocity of the autonomous vehicle according to a second trajectory; and
based on a third determination that the probability is less than the second threshold probability, performing an obstacle avoidance maneuver.

2. The system of claim 1, wherein:
the first trajectory comprises maintaining a velocity of the autonomous vehicle; and
the second trajectory comprises at least one of:
slowing a velocity of the autonomous vehicle;
stopping the autonomous vehicle prior to a location associated with the object; or
adjusting a lateral position of the autonomous vehicle to avoid the object.

3. The system of claim 1, wherein the autonomous vehicle is controlled according to the second trajectory, the second trajectory comprising a second speed that is less than a first speed associated with the first trajectory, the operations further comprising:
capturing additional sensor data that represents the object in the environment;
determining an updated probability that the object comprises the region of particulate matter based at least in part on the additional sensor data; and
controlling, based at least in part on the updated probability, the autonomous vehicle according to a third trajectory, the third trajectory comprising a third speed that is greater than the second speed.

4. The system of claim 1, the operations further comprising:
determining a distance between the autonomous vehicle to a location associated with the object; and
determining a rate of deceleration to stop the autonomous vehicle prior to the location associated with the object,
wherein controlling the autonomous vehicle according to the second trajectory comprises controlling the autonomous vehicle in accordance with the rate of deceleration.

5. The system of claim 1, wherein the autonomous vehicle is controlled according to the second trajectory, the operations further comprising:
determining that an area adjacent the autonomous vehicle is unoccupied by other objects; and
determining a lateral acceleration associated with a movement of the autonomous vehicle into the area,
wherein the second trajectory comprises the lateral acceleration.

6. A method comprising:
receiving sensor data captured by a sensor in an environment;
determining that the sensor data represents an object in the environment;

inputting at least a portion of the sensor data associated with the object into a machine learned model;

receiving, from the machine learned model, a probability that the object comprises a region of particulate matter, wherein the probability is based at least in part on at least one feature associated with the object, the at least one feature comprising a size or a shape of the object;

based on a first determination that the probability is equal to or greater than a first threshold, controlling a vehicle according to a first trajectory;

based on a second determination that the probability is equal to or greater than a second threshold and less than the first threshold, controlling a velocity of a vehicle according to a second trajectory; and based on a third determination that the probability is less than the second threshold, performing an obstacle avoidance maneuver.

7. The method of claim 6, wherein controlling the vehicle comprises at least one of:

determining that the probability is associated with a first probability that the object is associated with the region of particulate matter and stopping the vehicle prior to a location associated with the object;

determining that the probability is associated with a second probability that the object is associated with the region of particulate matter and slowing a velocity of the vehicle, wherein the second probability is higher than the first probability; or determining that the probability is associated with a third probability that the object is associated with the region of particulate matter and maintaining the velocity of the vehicle, wherein the third probability is higher than the second probability.

8. The method of claim 6, further comprising:
determining a distance between the vehicle and a location associated with the object; and
determining that the distance is greater than a threshold distance,
wherein controlling the vehicle comprises slowing the vehicle to capture additional sensor data associated with the object.

9. The method of claim 8, further comprising:
determining an updated probability based at least in part on the additional sensor data; and
increasing a speed of the vehicle based at least in part on the updated probability.

10. The method of claim 6, further comprising:
determining that the probability is less than a threshold probability;
determining a distance between the vehicle and a location associated with the object; and
determining a rate of deceleration based at least in part on the distance,
wherein controlling the vehicle comprises slowing the vehicle at the rate of deceleration.

11. The method of claim 6, further comprising:
determining that the probability is less than a threshold probability;
determining that the vehicle is occupied by a passenger; and
determining a rate of deceleration based at least in part on the passenger,
wherein controlling the vehicle comprises slowing the vehicle at the rate of deceleration.

12. The method of claim 6, wherein controlling the vehicle comprises:

determining a first action for the vehicle to take based at least in part on the probability;

determining a second action for the vehicle to take based at least in part on the probability;

determining a first cost associated with the first action and a second cost associated with the second action;

determining that the first cost associated with the first action is less than the second cost associated with the second action; and causing the vehicle to perform the first action based at least in part on the first cost being less than the second cost.

13. The method of claim 12, wherein at least one of the first action or the second action comprises at least one of:
maintaining a trajectory of the vehicle;
reducing a speed of the vehicle to a pre-determined speed;
reducing the speed of the vehicle to a dynamically determined speed;
stopping the vehicle prior to a location associated with the object; or
adjusting a lateral position of the vehicle to avoid the object.

14. The method of claim 6, further comprising:
determining that the probability is less than a threshold probability;
determining a first distance between the vehicle and a location associated with the object;
determining a second distance for the vehicle to stop at a rate of deceleration; and
determining that the second distance exceeds the first distance,
wherein controlling the vehicle comprises adjusting a lateral position of the vehicle to avoid the object.

15. One or more non-transitory computer-readable media storing instructions that when executed by one or more processors perform operations comprising:

receiving sensor data captured by a sensor in an environment;

determining that the sensor data represents an object in the environment;

determining, using a machine learned model, a probability that the object comprises a region of particulate matter, wherein the probability that the object comprises the region of particulate matter is determined based at least in part on at least one of a size, shape, track or location associated with the object;

based on a first determination that the probability is equal to or greater than a first threshold, controlling a vehicle according to a first trajectory;

based on a second determination that the probability is equal to or greater than a second threshold and less than the first threshold, controlling a velocity of a vehicle according to a second trajectory; and based on a third determination that the probability is less than the second threshold, performing an obstacle avoidance maneuver.

16. The one or more non-transitory computer-readable media of claim 15, wherein controlling the vehicle comprises maintaining a trajectory associated with the vehicle.

17. The one or more non-transitory computer-readable media of claim 15, wherein controlling the vehicle comprises modifying a trajectory associated with the vehicle, modifying the trajectory comprising at least one of:
reducing a speed of the vehicle to a pre-determined speed;
stopping the vehicle; or
adjusting a lateral position of the vehicle to avoid the object.

18. The one or more non-transitory computer-readable media of claim 15, the operations further comprising:
   determining that a distance between the vehicle and the location associated with the object is above a threshold distance,
   wherein controlling the vehicle comprises causing the vehicle to travel at a first speed;
   capturing additional sensor data that represents the object in the environment;
   determining an updated probability that the object comprises the region of particulate matter based at least in part on the additional sensor data; and
   causing, based at least in part on the updated probability, the vehicle to accelerate to a second speed, the second speed being greater than the first speed.

19. The one or more non-transitory computer-readable media of claim 15, the operations further comprising:
   determining a first action for the vehicle to take based at least in part on the probability;
   determining a second action for the vehicle to take based at least in part on the probability;
   determining a first cost associated with the first action and a second cost associated with the second action;
   determining that the first cost associated with the first action is less than the second cost associated with the second action; and
   causing the vehicle to perform the first action based at least in part on the first cost being less than the second cost.

20. The one or more non-transitory computer-readable media of claim 19, wherein at least one of the first action or the second action comprises at least one of:
   maintaining a trajectory of the vehicle;
   reducing a speed of the vehicle to a pre-determined speed;
   reducing the speed of the vehicle to a dynamically determined speed;
   stopping the vehicle prior to a location associated with the object; or
   adjusting a lateral position of the vehicle to avoid the object.

* * * * *